United States Patent
Mahdi et al.

(10) Patent No.: US 10,708,311 B2
(45) Date of Patent: *Jul. 7, 2020

(54) CIRCUIT-SWITCHED AND MULTIMEDIA SUBSYSTEM VOICE CONTINUITY

(71) Applicant: Ericsson AB, Stockholm (SE)

(72) Inventors: Kaniz Mahdi, Carrollton, TX (US); Dany Sylvain, Gatineau (CA)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,470

(22) Filed: Jun. 10, 2014

(65) Prior Publication Data

US 2014/0286332 A1 Sep. 25, 2014

Related U.S. Application Data

(63) Continuation of application No. 11/378,776, filed on Mar. 17, 2006, now Pat. No. 8,873,540.

(Continued)

(51) Int. Cl.
*H04L 29/06* (2006.01)
*H04L 12/64* (2006.01)
(Continued)

(52) U.S. Cl.
CPC ...... *H04L 65/1016* (2013.01); *H04L 12/6418* (2013.01); *H04L 65/1023* (2013.01);
(Continued)

(58) Field of Classification Search
USPC .......................................... 370/352–356, 349
See application file for complete search history.

(56) References Cited

U.S. PATENT DOCUMENTS

| 5,497,411 A | 3/1996 | Pellerin |
| 6,067,453 A | 5/2000 | Adiwoso et al. |

(Continued)

FOREIGN PATENT DOCUMENTS

| CA | 2501991 A1 | 4/2004 |
| WO | 0060785 A1 | 10/2000 |

(Continued)

OTHER PUBLICATIONS

Author Unknown, "3rd Generation Partnership Project; Technical Specification Group Services and System Aspects; Voice Call Continuity Between CS and Ims Study (Release 7)", 3GPP Technical Report 23.806, Version 7.0.0, Dec. 1, 2005, 3GPP Organizational Partners, 153 pages.

(Continued)

*Primary Examiner* — Khaled M Kassim
(74) *Attorney, Agent, or Firm* — Withrow & Terranova, PLLC

(57) ABSTRACT

The present invention moves service control, including call control, for a user element from a cellular network to a multimedia subsystem (MS), such as the Internet Protocol (IP) Multimedia Subsystem (IMS). Call control is provided by the MS irrespective of whether the user element is using cellular or WLAN access for the call. Call control for originating and terminating calls in the CS or MS as well as transferring calls between a circuit-switched subsystem (CS) and MS is anchored at a continuity control function (CCF) in the MS. All call signaling for the call is passed through the CCF. The CCF is a service provided in the user element's home MS and anchors the user element's active CS calls and MS sessions to enable active roaming across the CS and MS.

27 Claims, 15 Drawing Sheets

Related U.S. Application Data

(60) Provisional application No. 60/662,888, filed on Mar. 17, 2005, provisional application No. 60/684,046, filed on May 24, 2005, provisional application No. 60/753,158, filed on Dec. 22, 2005.

(51) Int. Cl.
| | |
|---|---|
| *H04Q 3/00* | (2006.01) |
| *H04W 36/00* | (2009.01) |
| *H04W 80/10* | (2009.01) |
| *H04W 88/06* | (2009.01) |

(52) U.S. Cl.
CPC ...... *H04L 65/1043* (2013.01); *H04L 65/1069* (2013.01); *H04Q 3/0025* (2013.01); *H04Q 3/0045* (2013.01); *H04W 36/0022* (2013.01); *H04L 2012/6481* (2013.01); *H04L 2012/6486* (2013.01); *H04W 80/10* (2013.01); *H04W 88/06* (2013.01)

(56) References Cited

U.S. PATENT DOCUMENTS

| | | | |
|---|---|---|---|
| 6,208,627 | B1 | 3/2001 | Menon et al. |
| 6,353,596 | B1 | 3/2002 | Grossglauser et al. |
| 6,721,565 | B1 | 4/2004 | Ejzak et al. |
| 6,940,847 | B1* | 9/2005 | Glitho et al. ............... 370/352 |
| 6,961,774 | B1 | 11/2005 | Shannon et al. |
| 8,873,540 | B2 | 10/2014 | Mandi et al. |
| 2002/0133600 | A1 | 9/2002 | Williams et al. |
| 2003/0027569 | A1 | 2/2003 | Ejzak |
| 2003/0174688 | A1 | 9/2003 | Ahmed et al. |
| 2004/0157600 | A1* | 8/2004 | Stumpert et al. .......... 455/432.1 |
| 2004/0190498 | A1 | 9/2004 | Kallio et al. |
| 2004/0246990 | A1 | 12/2004 | Krishnamurthi et al. |
| 2004/0249887 | A1* | 12/2004 | Garcia-Martin et al. ..... 709/204 |
| 2005/0002407 | A1 | 1/2005 | Shaheen et al. |
| 2005/0003797 | A1 | 1/2005 | Baldwin |
| 2005/0157677 | A1* | 7/2005 | Dowling ............... G06Q 20/04 370/328 |
| 2005/0215228 | A1* | 9/2005 | Fostick ................ H04L 67/14 455/403 |
| 2005/0232225 | A1* | 10/2005 | Pelaez ............... H04L 29/12594 370/351 |
| 2005/0245261 | A1* | 11/2005 | Ejzak ........................... 455/436 |
| 2005/0286531 | A1 | 12/2005 | Tuohino et al. |
| 2006/0002355 | A1* | 1/2006 | Baek .................. H04W 36/14 370/338 |
| 2006/0034270 | A1 | 2/2006 | Haase et al. |
| 2006/0056607 | A1* | 3/2006 | Halkosaari ............ H04L 12/14 379/114.12 |
| 2006/0068816 | A1* | 3/2006 | Pelaez ............ H04M 1/274516 455/466 |
| 2006/0072549 | A1 | 4/2006 | Goldman et al. |
| 2006/0083199 | A1* | 4/2006 | Yang ................. H04L 29/06027 370/331 |
| 2006/0104306 | A1* | 5/2006 | Adamczyk ............. H04L 67/24 370/466 |
| 2006/0111114 | A1 | 5/2006 | Marin et al. |
| 2006/0111115 | A1 | 5/2006 | Marin et al. |
| 2006/0140377 | A1* | 6/2006 | Miao ....................... H04M 3/58 379/211.02 |
| 2006/0198334 | A1* | 9/2006 | Civanlar .......... H04L 29/06027 370/328 |
| 2006/0198360 | A1* | 9/2006 | Biage et al. ................. 370/352 |
| 2006/0285537 | A1 | 12/2006 | Mandi |
| 2007/0004415 | A1 | 1/2007 | Kbedi |
| 2007/0014281 | A1 | 1/2007 | Kant |
| 2007/0100981 | A1 | 5/2007 | Adamczyk et al. |
| 2007/0153736 | A1 | 7/2007 | Mow et al. |
| 2009/0052385 | A1* | 2/2009 | Sylvain et al. .............. 370/329 |

FOREIGN PATENT DOCUMENTS

| | | |
|---|---|---|
| WO | 0103450 A1 | 1/2001 |
| WO | 0122657 A1 | 3/2001 |
| WO | 2004019173 A2 | 3/2004 |

OTHER PUBLICATIONS

Author Unknown, "3rd Generation Partnership Project; Technical Specification Group Services and System Aspects; Voice Call Continuity between CS and Ims; Stage 2 (Release 7)," 3GPP Technical Standard 23.206, Version 0.3.0, Feb. 2006, 3GPP Organizational Partners, 22 pages.

Author Unknown, "3rd Generation Partnership Project; Technical Specification Group Core Network; Mobile radio interface Layer 3 specification; Core network protocols; Stage 3 (Release 6)," 3GPP Technical Standard 24.008, Version 6.7.0, Jan. 2005, 3GPP Organizational Partners, 507 pages.

Author Unknown, "Digital cellular telecommunications system (Phase 2+); Universal Mobile Telecommunications System (UMTS); Voice Call Continuity (VCC) between Circuit Switched (CS) and IP Multimedia Subsystem (IMS); 2 (3GPP TS 23.206 version 7.5.0 Release 7)," ETSI Technical Standard 123 206, Version 7.5.0, Jan. 2008, European Telecommunications Standards Institute, 38 pages.

Author Unknown, "Wid for Voice Call Continuity Between CS and IMS (incl. I WLAN)," Tdoc S2-050495, Technical Specification Group Services and Systems Aspects, Meeting #27, Mar. 14-17, 2005, Tokyo, Japan, 5 pages.

Author Unknown, "Architectural Alternative for CS-IMS Voice Call Continuity Based on IMS Control," S2-050676, 3GPP TSG SA WG2 Architecture—52#45, Apr. 4-8, 2005, Beijing, China, 10 pages.

Strater, J. et al., "Seamless Mobility Between Home Networks and Cable Service," Motorola White Paper, May 27, 2005, 17 pages.

Non-Final Office Action for U.S. Appl. No. 11/378,776, dated Aug. 18, 2010, 20 pages.

Final Office Action for U.S. Appl. No. 11/378,776, dated Mar. 9, 2011, 22 pages.

Non-Final Office Action for U.S. Appl. No. 11/378,776, dated Jan. 20, 2012, 13 pages.

Final Office Action for U.S. Appl. No. 111378,776, dated May 24, 2012, 13 pages.

Advisory Action for U.S. Appl. No. 111378,776, dated Nov. 5, 2012, 3 pages.

Non-Final Office Action for U.S. Appl. No. 11/378,776, dated Nov. 22, 2013, 14 pages.

Notice of Allowance for U.S. Appl. No. 111378,776, dated May 28, 2014, 16 pages.

International Search Report for PCT/IB2006/000607, dated Aug. 28, 2006, 1 page.

International Search Report for PCT/IB2006/001362, dated Oct. 5, 2006, 1 page.

International Search Report for PCT/IB2006/001564, dated Nov. 14, 2006, 1 page.

Extended European Search Report for Patent Application No. 06 727 330.0/2413,dated Jun. 20, 2012, 6 pages.

Extended European Search Report for European Patent Application No. 17185277.5, dated Nov. 7, 2017, 7 pages.

First Office Action for Chinese Patent Application No. 200680016956.4, dated Apr. 26, 2010, 11 pages.

Second Office Action for Chinese Patent Application No. 200680016956.4, dated Dec. 14, 2010, 5 pages.

Author Unknown, "IP Multimedia Subsystem," Wikipedia, Available online at: «https://en.wikipedia.org/wiki/IP_Multimedia_Subsystem>>, page last edited: May 14, 2018, 15 pages.

Author Unknown, "3rd Generation Partnership Project; Technical Specification Group Services and System Aspects; Voice Call Continuity Between CS and IMS Study (Release 7)", 3GPP Technical Report 23.806, Version 0.2.1, Apr. 2005, 3GPP Organizational Partners, 119 pages.

(56) References Cited

OTHER PUBLICATIONS

Hari, A. et al., "Intelligent Media Gateway Selection in a VoIP Network," Bell Labs Technical Journal, vol. 10, No. 1, Mar. 21, 2005, Wiley Periodicals, Inc., 11 pages.
Examination Report for European Patent Application No. 06727330.0, dated Mar. 14, 2013, 4 pages.
Result of Consultation for European Patent Application No. 17185277.5, dated Jun. 21, 2019, 4 pages.
Non-Final Office Action for U.S. Appl. No. 11/451,722, dated Apr. 2, 2009, 11 pages.
Non-Final Office Action for U.S. Appl. No. 11/451,722, dated Oct. 14, 2009, 15 pages.
Final Office Action for U.S. Appl. No. 11/451,722, dated Apr. 2, 2010, 17 pages.
Non-Final Office Action for U.S. Appl. No. 11/451,722, dated Dec. 9, 2010, 13 pages.
Final Office Action for U.S. Appl. No. 11/451,722, dated May 24, 2011, 13 pages.
Notice of Allowance for U.S. Appl. No. 11/451,722, dated Mar. 15, 2012, 7 pages.
Extended European Search Report for European Patent Application No. 06779708.4, dated Jun. 25, 2013, 9 pages.
Intention to Grant for European Patent Application No. 06779708.4, dated Apr. 30, 2014, 7 pages.
Extended European Search Report for European Patent Application No. 14183001.8, dated Dec. 23, 2014, 9 pages.
Examination Report for European Patent Application No. 14183001.8, dated Apr. 13, 2017, 7 pages.
Examination Report for European Patent Application No. 14183001.8, dated Dec. 12, 2018, 5 pages.
Examination Report for European Application No. 14183001.8 dated Jan. 2, 2020, 5 pages.
International Search Report and Written Opinion for International Patent Application No. PCT/IB2006/002282, dated Feb. 2, 2007, 6 pages.

\* cited by examiner

CIRCUIT-SWITCHED AND MULTIMEDIA SUBSYSTEM VOICE CONTINUITY

This application is a continuation of U.S. patent application Ser. No. 11/378,776, filed on Mar. 17, 2006, now U.S. Pat. No. 8,873,540, which claims the benefit of U.S. provisional patent applications 60/662,888 filed on Mar. 17, 2005; 60/684,046 filed on May 24, 2005; and 60/753,158 filed on Dec. 22, 2005, the disclosures of which are hereby incorporated by reference in their entireties.

FIELD OF THE INVENTION

The present invention relates to communications and in particular to providing a centralized control function for supporting calls over circuit-switched subsystems and packet subsystems as well as effecting transfers of established calls from one subsystem to another.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can establish calls via the cellular network and WLAN using the respective communication interfaces; however, calls established via the cellular network are not easily transferred to the WLAN, and vice versa. Further, when calls are transferred, there is at best limited ability to maintain control over the call and to provide services associated with the call.

Accordingly, there is a need for a technique to effectively support calls for a user element over both cellular networks and WLANs as well as provide seamless transfers for established calls between the respective networks. There is a further need for a technique to maintain services associated with the call after a transfer from one network to another.

SUMMARY OF THE INVENTION

The present invention moves service control, including call control, for a user element from a cellular network to a multimedia subsystem (MS), such as the Internet Protocol (IP) Multimedia Subsystem (IMS). As such, call control is provided by the MS irrespective of whether the user element is using cellular or WLAN access for the call. For clarity and conciseness, a cellular network providing circuit-switched communications is referred to as circuit-switched subsystem (CS), and a WLAN providing packet communications is assumed to be part of or associated with the MS.

Call control for originating and terminating calls in the CS or MS as well as transferring calls between the CS and MS is anchored at a continuity control function (CCF) in the MS. All call signaling for the call is passed through the CCF. The CCF is a service provided in the user element's home MS and anchors the user element's active CS calls and MS sessions to enable mobility across the CS and MS while maintaining the CS calls or MS sessions.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS.

Subsystem transfers enable the user element to move between the CS and the MS while maintaining one or more active calls. Call transfers associated with a given call, including initial and subsequent transfers, are executed and controlled in the home MS by the CCF, generally upon a request received from the user element. To enable such transfers, the CCF is inserted into the signaling path of the calls by a serving call/session control function (S-CSCF). To anchor the signaling path, the CCF will employ a back-to-back user agent function, which may operate as follows. When the user element originates a call, the CCF will terminate an access signaling leg from the user element and establish a remote signaling leg toward the remote endpoint. When terminating a call at the user element, the CCF will terminate a remote signaling leg from the remote endpoint and establish an access signaling leg toward the user element. Subsequently, the CCF will coordinate call signaling between the access signaling leg and the remote signaling leg for the call.

When the user element is originating a call, the CCF appears as a service provided by an application server. In one embodiment, the CCF is invoked as the first service in a chain of services. When the user element is terminating a call, the CCF is invoked as the last service in a chain of services. By locating the CCF with respect to the other services in this manner, other applications associated with the call are anchored by the CCF as part of the remote signaling leg of the call, and are therefore not impacted by transfers affecting the access signaling leg.

Upon detecting conditions requiring a transfer, the user element will establish an access signaling leg with the CCF using the CS or MS based address for the CCF. The access signaling leg is established via the "transferring-in" subsystem to request a transfer to the transferring-in subsystem. The CCF will execute a subsystem transfer procedure by replacing the access signaling leg currently communicating with the remote signaling leg with the access signaling leg established via the transferring-in subsystem. The CCF will subsequently release the access signaling leg that was established through the "transferring-out" subsystem.

The switch of the access signaling legs from the transferring-out subsystem to the transferring-in subsystem does not impact the remote signaling leg or the application services in the remote signaling leg. Through the access signaling leg in the transferring-in subsystem and the remote signaling leg, the appropriate bearer path may be established to the user element via the appropriate CS client or MS client. Since all call signaling is provided through the CCF, additional services may be associated with the call through any number of transfers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
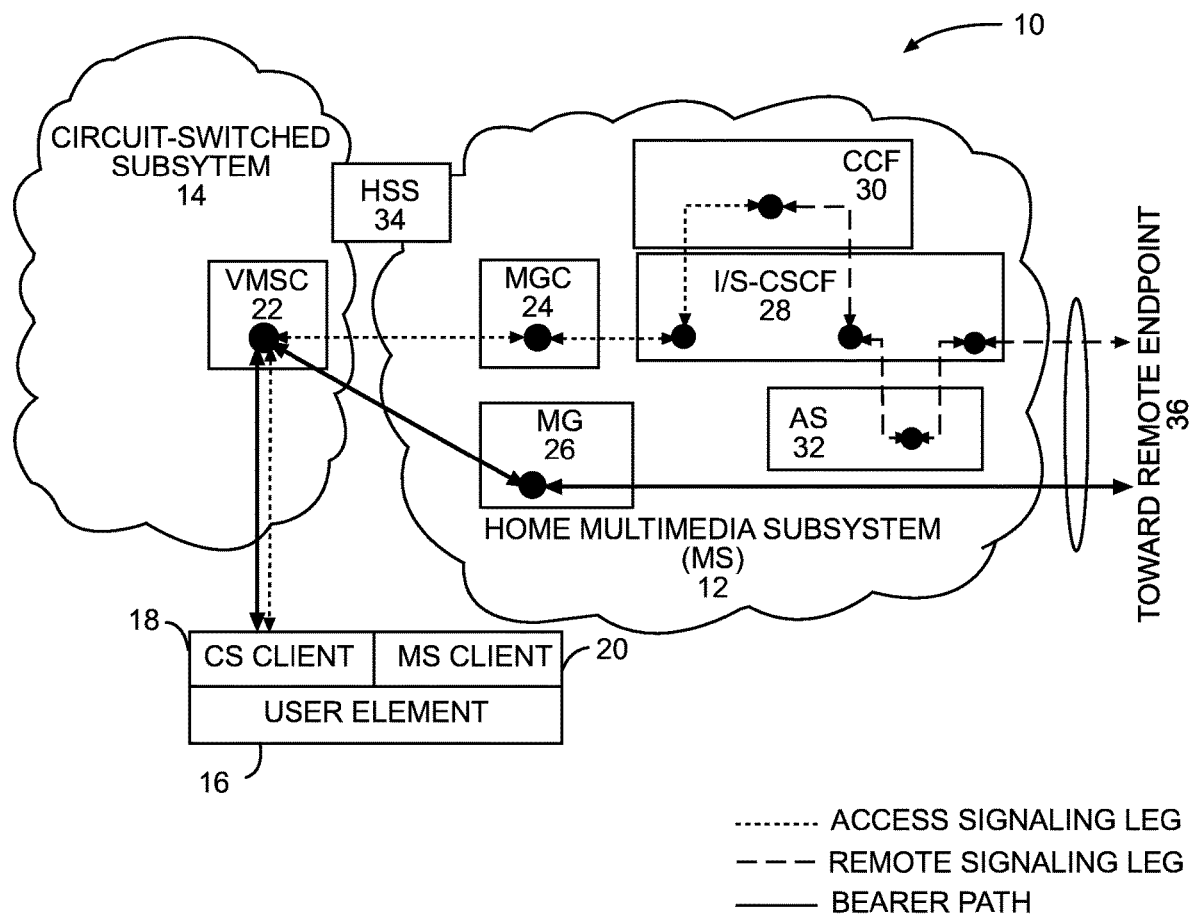
FIG. 1 is a communication environment illustrating circuit-switched subsystem access for a user element according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention moves service control, including call control, for a user element from a cellular network to a multimedia subsystem (MS), such as the Internet Protocol (IP) Multimedia Subsystem (IMS). As such, call control is provided by the MS irrespective of whether the user element is using cellular or WLAN access for the call. For clarity and conciseness, a cellular network providing circuit-switched communications is referred to as circuit-switched subsystem (CS), and a WLAN providing packet communications is assumed to be part of or associated with the MS. In general, wireless communication techniques having relatively limited range, such as WLAN techniques, are referred to as local wireless communication techniques. Thus, local wireless communication techniques support packet-based communications, wherein cellular communication techniques will generally support circuit-switched communications. Further, the wireless access for local wireless techniques are of a limited range with respect to cellular access techniques.

Call control for originating and terminating calls in the CS or MS as well as transferring calls between the CS and MS is anchored at a continuity control function (CCF) in the MS. All call signaling for the call is passed through the CCF. The CCF is a service provided in the user element's home MS and anchors the user element's active CS calls and MS sessions to enable mobility across the CS and MS while maintaining CS calls or MS sessions.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs Third Party Call Control function to provide call control in the CS. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS. In the following description, 3GPP TS 24.008 (DTAP) is used in the CS while the Session Initiation Protocol (SIP) is used in the MS to effect origination, termination, and transfer of calls. Those skilled in the art will recognize other applicable and useful protocols as substitutes for DTAP and SIP.

Turning now to FIG. 1, a communication environment 10 is illustrated according to one embodiment of the present invention. In the communication environment 10, a home MS 12 and a visited CS 14 support communications for a user element 16. The user element 16 includes a CS client 18 and an MS client 20, which are configured to support circuit-switched communications via the CS 14 as well as packet communications via the MS 12, respectively. For communications within the CS 14, a visited mobile switching center (VMSC) 22 will support circuit-switched communications for the user element 16. The VMSC 22 may interact with the home MS 12 via a media gateway controller (MGC) 24 and an associated media gateway (MG) 26, both of which are affiliated with the MS 12.

The home MS 12 may include various functions or entities, including an interrogating and serving call/session control function (I/S-CSCF) 28, a CCF 30, an application server (AS) 32, and a home subscriber service (HSS) 34. Notably, the interrogating CSCF provides the standard I-CSCF functions and the serving CSCF provides standard S-CSCF functions. These functions are represented in the I/S-CSCF 28 for conciseness. Further, the HSS 34 may have a presence in both the CS 14 and the MS 12. The HSS 34 may include a home location resource component for home CS. Call/session control functions (CSCFs) in the home MS 12 generally act as SIP proxies and provide various functions in association with call control, as will be appreciated by those skilled in the art. In operation, an interrogating CSCF (I-CSCF) may interact with the HSS 34 to identify the serving CSCF (S-CSCF), which will be assigned to support a given user element. For the present invention, the HSS 34 may maintain an association between a user element 16 and a particular CCF 30 that is assigned to the user element 16. As such, the HSS 34 will assist in identifying a serving CSCF for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element upon network registration.

Depending on whether the user element 16 is registered in the MS 12, different techniques may be used to access the MS 12. When the user element 16 is registered in the MS network 12, the user element 16 will have an S-CSCF assigned to it, and will use that S-CSCF to access the CCF 30. When the user element 16 is not registered in the MS network 12, a temporary S-CSCF may be assigned to the user element 16, and the temporary S-CSCF will be used to access the CCF 30.

The application servers 32 may be invoked and placed within the call signaling path to implement any number of features or services. When a particular application service provided by an application server 32 is invoked, all signaling for the associated call or session is passed through the application service, which has the opportunity to process call signaling messages as necessary to implement the desired service. Notably, the CCF 30 acts like a service, and as such, the I/S-CSCF 28 will operate to pass all call signaling messages for the call through the CCF 30, thereby allowing the CCF 30 to act as an anchor for the call.

In FIG. 1, the user element 16 is engaged in a call supported by the CS client 18 and controlled by the CCF 30. As such, call signaling for the call passes through the VMSC 22, media gateway controller 24, I/S-CSCF 28, CCF 30, and perhaps application server 32, if a service is invoked, on its way toward a remote endpoint 36. Notably, the access signaling leg, which is provided by the CS 14, is anchored at the CCF 30 and extends through the I/S-CSCF 28, media gateway controller 24, the VMSC 22, and CS client 18 of the user element 16. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a call transfer is required, the CCF 30 maintains the remote signaling leg and establishes a new access signaling leg.

The bearer path for the call illustrated in FIG. 1 extends from the CS client 18 through the VMSC 22 and media gateway 26 on its way toward the remote endpoint 36. Notably, the media gateway controller 24 cooperates with the media gateway 26, such that a circuit-switched connection may be established between the media gateway 26 and the CS client 18 via the VMSC 22. The packet session may be established for the call from the media gateway 26 through the home MS 12 toward the remote endpoint 36.

Figure 2:
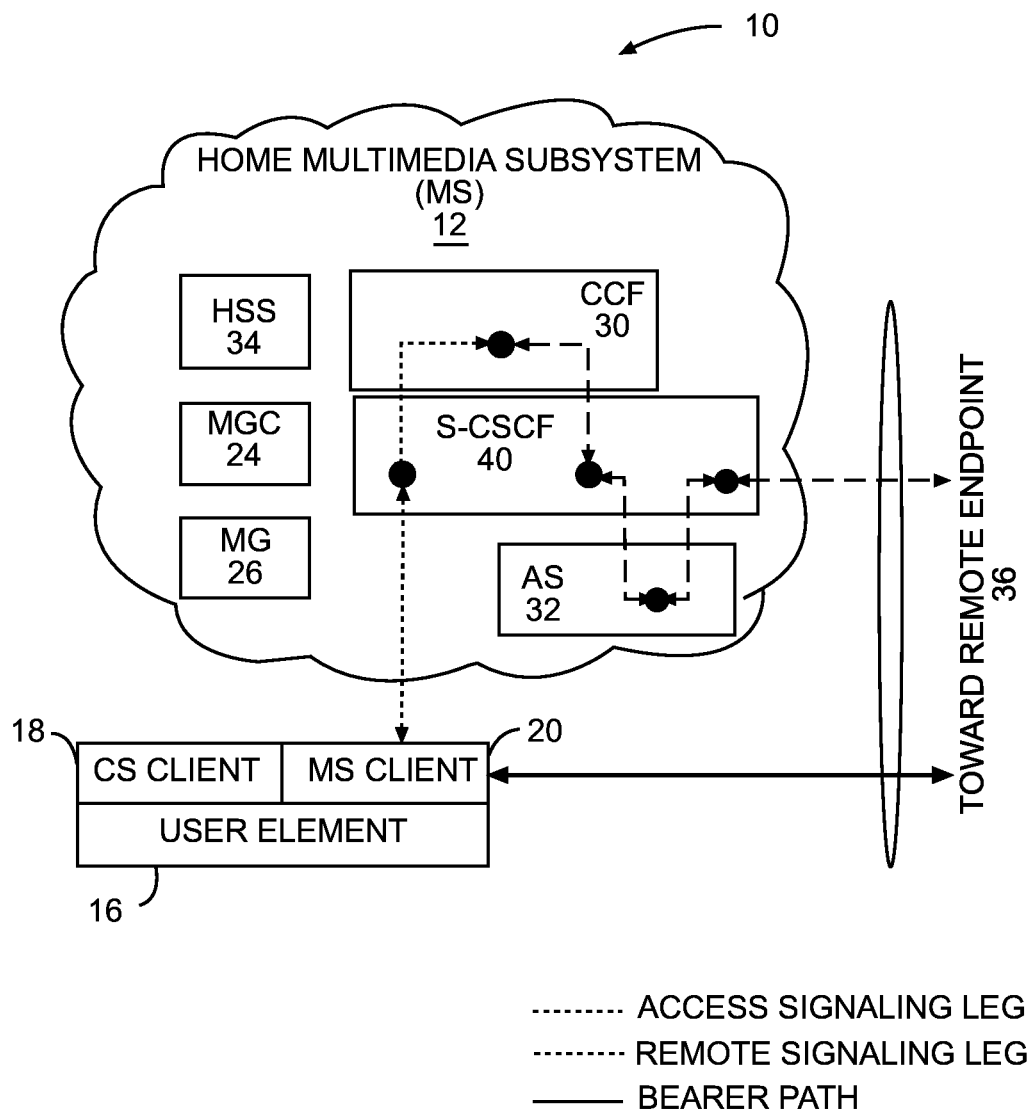
FIG. 2 is a communication environment illustrating multimedia subsystem access for a user element according to one embodiment of the present invention.

With reference to FIG. 2, a call supported by the MS client 20 of the user element 16 is represented. Notably, the call does not extend through the CS 14, and will not employ the services of the VMSC 22, media gateway controller 24, or media gateway 26. Instead, the MS client 20 will support call signaling directly with the MS 12, and in particular with the CCF 30 via a serving-CSCF (S-CSCF) 40. Notably, the I/S-CSCF 28 and the S-CSCF 40 may represent the same CSCF or different CSCFs, depending on how the user element 16 registers with the MS 12.

As illustrated, call signaling is anchored in the CCF 30, wherein an access signaling leg is provided between the CCF 30 and the MS client 20 via the S-CSCF 40. A remote signaling leg is supported between the remote endpoint 36 and the CCF 30 via the S-CSCF 40 and any desired application servers 32 that may provide additional services in association with the call. The bearer path will extend from the MS client 20 toward the remote endpoint 36 via the MS 12, without traveling through the CS 14 (FIG. 1). Again, the CCF 30 anchors the call, such that if transfer is required, the remote signaling leg toward the remote endpoint 36 can be maintained, while the access signaling leg may be changed to facilitate the transfer from the home MS 12 to the CS 14, as will be described further below. For transfer of calls between the CS 14 and the MS 12, the access signaling legs illustrated in FIGS. 1 and 2 will be changed to support the transfer, while the remote signaling leg is maintained by the CCF 30.

Subsystem transfers enable the user element 16 to move between the CS 14 and the MS 12 while maintaining one or more active calls (voice sessions). Call transfers associated with a given call, including initial and subsequent transfers, are executed and controlled in the home MS 12 by the CCF 30, upon a request received from the user element 16. To enable such transfers, the CCF 30 is inserted into the signaling path of the calls by an S-CSCF (28 or 40). To anchor the signaling path, the CCF 30 will employ a back-to-back user agent function (B2BUA), which may operate as follows. When the user element 16 originates a call, the CCF 30 will terminate an access signaling leg from the user element 16 and establish a remote signaling leg toward the remote endpoint 36. When terminating a call at the user element 16, the CCF 30 will terminate a remote signaling leg from the remote endpoint 36 and establish an access signaling leg toward the user element 16. Subsequently, the CCF 30 will coordinate call signaling between the access signaling leg and the remote signaling leg for the call.

When the user element 16 is originating a call, the CCF 30 appears as a service provided by an application server, such as the application server 32. In one embodiment, the CCF 30 is invoked as the first service in a chain of services. When the user element 16 is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

Upon detecting conditions requiring a transfer, the user element 16 will establish an access signaling leg with the CCF 30 using the CS or MS based address for the CCF 30. The access signaling leg is established via the "transferring-in" subsystem to request a transfer to the transferring-in subsystem. The CCF 30 will execute a subsystem transfer procedure by replacing the access signaling leg currently communicating to the remote signaling leg with the access signaling leg established via the transferring-in subsystem. The CCF 30 will subsequently release the access signaling leg that was established through the "transferring-out" subsystem. The switch of the access signaling legs from the transferring-out subsystem to the transferring-in subsystem does not impact the remote signaling leg or the application services in the remote signaling leg. Through the access signaling leg in the transferring-in subsystem and the remote signaling leg, the appropriate bearer path may be established to the user element 16 via the appropriate CS client 18 or MS client 20. Since all call signaling is provided through the CCF 30, additional services may be associated with the call through any number of transfers. Further details are provided in association with the following communication flows.

In one embodiment of the present invention, the MSISDN or other user element identifier is owned and controlled by the MS 12 to enable anchoring of incoming calls intended for the user element 16 at the CCF 30. Incoming calls destined for the user element 16 and originated from the CS 14, the public switched telephone network (PSTN), or other MS can be anchored at the CCF 30 by setting up routing functions at the originating service nodes, such that incoming calls intended for the user element 16 are delivered to the home MS 12. As such, the CCF 30 can take the necessary steps to find the user element 16 and route the call to the user element 16, even if the user element 16 is in the CS 14 when the call arrives.

As indicated, the HSS 34 may store filter criteria associated with the CCF 30 as part of the user element's subscription profile. The CCF filter criteria is downloaded to the currently assigned S-CSCF (28 or 40) as part of the initial filter criteria to use when the user element 16 registers with the MS 12. This filter criteria is generally executed at the S-CSCF 40 (or 28) upon initiation of a call or session from the user element 16 or upon receipt of an incoming session intended for the user element 16. This filter criteria will instruct the S-CSCF 40 (or 28) to invoke the CCF 30 to control at least the bearer path for the call or session.

Figure 3A:
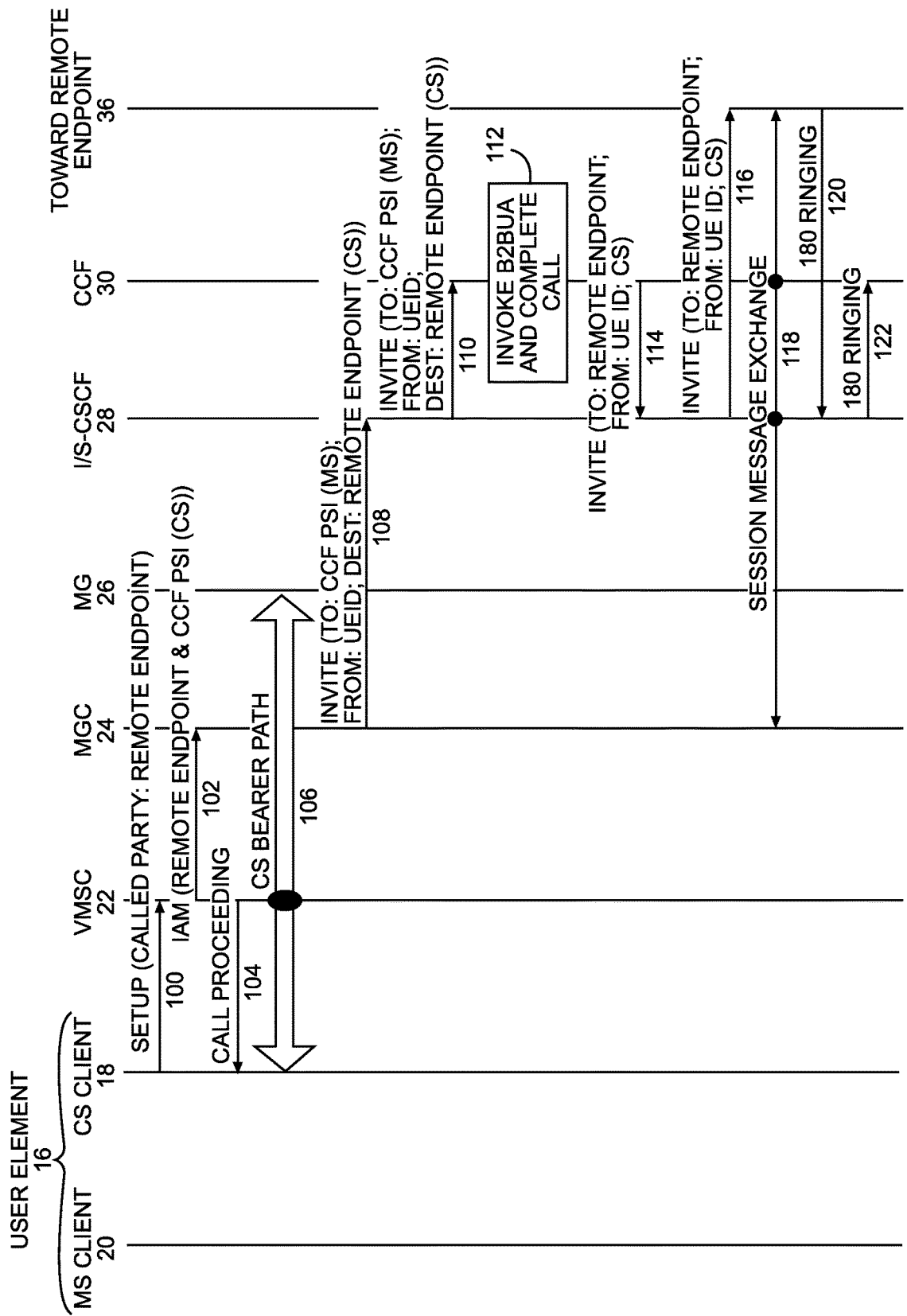
FIGS. 3A and 3B show a communication flow illustrating originating a call via the circuit-switched subsystem according to one embodiment of the present invention.
Figure 3B:
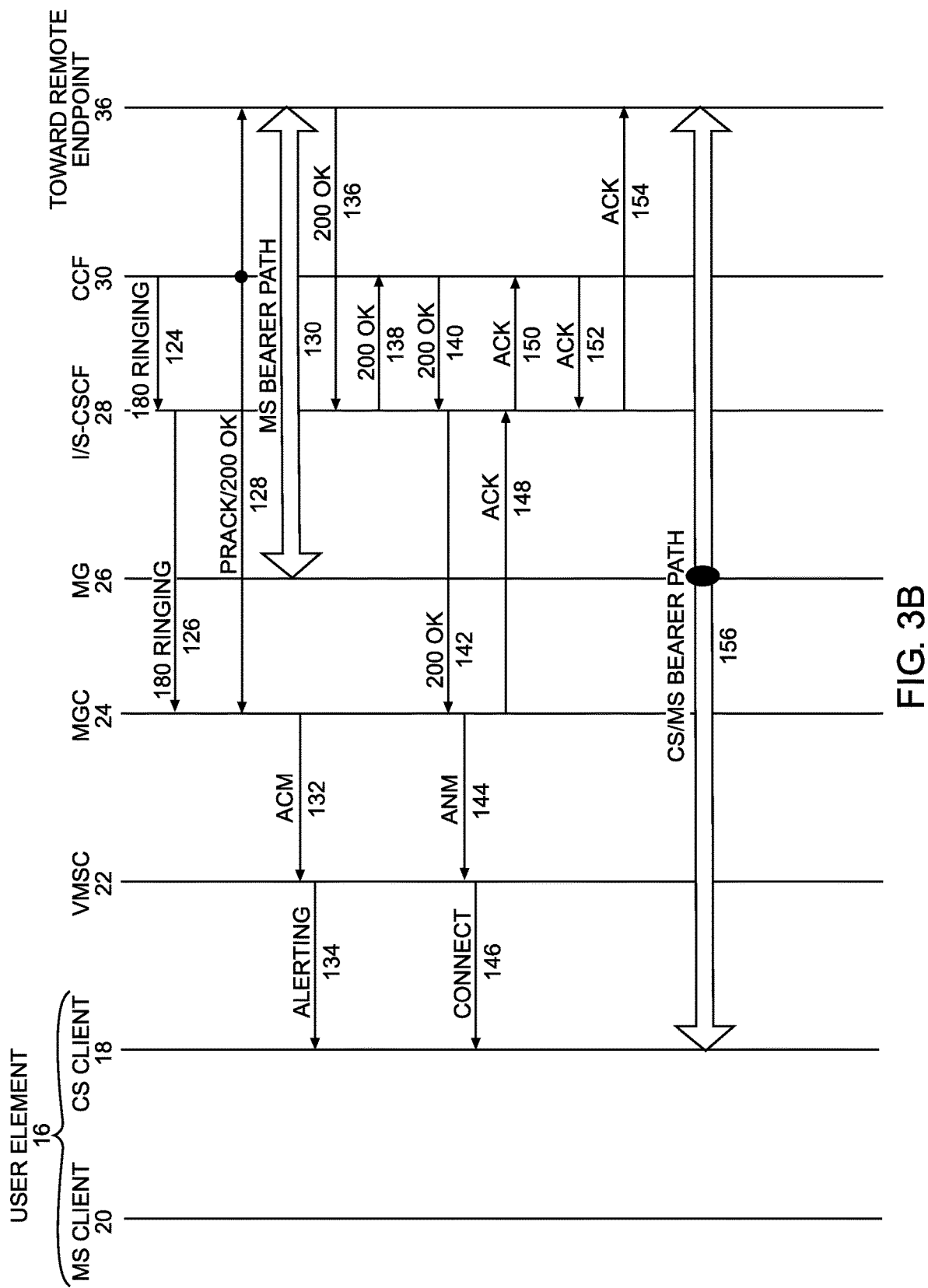

With reference to FIGS. 3A and 3B, a communication flow is provided to illustrate origination of a call from the CS client 18 of the user element 16 via the CS 14. Initially, the CS client 18 will send a call setup message to its supporting VMSC 22 (step 100). The call setup message will identify the directory number of the remote endpoint 36. In response, the VMSC 22 will send an Integrated Services User Part (ISUP) Initial Address Message (IAM) to the media gateway controller 24 addressing a routing number that identifies the remote endpoint, as well as including the CS PSI for the CCF 30 (step 102). The VMSC 22 will also provide a Call Proceeding message back to the CS client 18 of the user element 16 (step 104). This exchange results in a CS bearer leg being established from the CS client 18 to the media gateway 26 via the VMSC 22 (step 106). The media gateway controller 24 will act as a user agent on behalf of the user element 16.

Upon receiving the IAM from the VMSC 22, the media gateway controller 24 will send an Invite to the I/S-CSCF 28 to initiate establishment of an MS bearer leg toward the remote endpoint 36 for which the call is intended from the media gateway 26 (step 108). When generating the Invite, the media gateway controller 24 will identify the MS-based PSI for the CCF 30 in light of the CS-based PSI received in the IAM. The MS-based PSI for the CCF 30 is the address to which the Invite is sent. The Invite will also identify the user element 16 as the originator of the call and identify the remote endpoint 36 as the destination for the call. The Invite may also indicate that the call was originated through the CS 14. The I/S-CSCF 28 will recognize the need to invoke the CCF 30 for the call, and will send the Invite to the CCF 30 (step 110), which will invoke a back-to-back user agent (B2BUA) and then take the necessary steps to complete the call (step 112). As such, the CCF 30 will send an Invite back to the I/S-CSCF 28 to complete the call (step 114). The Invite will now include the address of the remote endpoint 36 or a supporting node with which a packet session can be established. The Invite will identify the media gateway controller 24 of the media gateway 26 as the other endpoint for the packet session that will support the call. The I/S-CSCF 28 will then send the Invite toward the remote endpoint 36 (step 116). At this point, the traditional session message exchange between the remote endpoint 36 and the media gateway controller 24 will take place through the CCF 30 and the I/S0-CSCF 28 to prepare the respective remote endpoint 36 and media gateway 26 to support the MS bearer leg (step 118).

In the meantime, the I/S-CSCF 28 may receive various signaling back from the remote endpoint 36, such as a 180 Ringing message (step 120). The 180 Ringing message indicates that the call is being presented to the remote endpoint 36. The I/S-CSCF 28 will route all signaling messages through the CCF 30, and as such, the 180 Ringing message is sent to the CCF 30 (step 122), which will forward the message back to the I/S-CSCF 28 (step 124). The I/S-CSCF 28 will send the 180 Ringing message to the media gateway controller 24 (step 126). After a Provisional Acknowledgement (PRACK) and 200 OK message exchange between the media gateway controller 24 and the remote endpoint 36 through the CCF 30 (step 128), the MS bearer path is effectively established (step 130), which means that the media gateway 26 and the remote endpoint 36 can send packets back and forth in association with the call.

The media gateway controller 24 will send an Address Complete Message (ACM) to the VMSC 22 (step 132), which will send an Alerting message to the user element 16 to indicate that call is being presented to the remote endpoint 36 (step 134). When the call is answered by the remote endpoint 36, the I/S-CSCF 28 will receive a 200 OK message (step 136) and route the 200 OK message to the CCF 30 (step 138). The CCF 30 will process the message if necessary, and then send the message back to the I/S-CSCF 28 (step 140), which will forward the 200 OK message to the media gateway controller 24 (step 142). The media gateway controller 24 will send an Answer Message (ANM) to the VMSC 22 (step 144), which will send a Connect message to the CS client 18 (step 146) to indicate that the call has been answered. To complete the call, the media gateway controller 24 will provide appropriate signaling to the media gateway 26, as well as send an acknowledgement (ACK) message back to the I/S-CSCF 28 (step 148). The I/S-CSCF 28 will again forward the ACK to the CCF 30 (step 150), which will forward the message back to the I/S-CSCF 28 (step 152). The I/S-CSCF 28 will then send the ACK toward the remote endpoint 36 (step 154).

At this point, a CS/MS bearer path is established between the CS client 18 of the user element 16 and the remote endpoint 36 via the media gateway 26 (step 156). Further, the call signaling associated with the call will be routed through the CCF 30. Notably, the back-to-back user agent invoked by the CCF 30 is the function that represents an endpoint for signaling associated with the remote signaling leg as well as an endpoint for the access signaling leg. The back-to-back user agent will provide any necessary processing or filtering and then relay messages over the respective access and remote signaling legs.

Figure 4A:
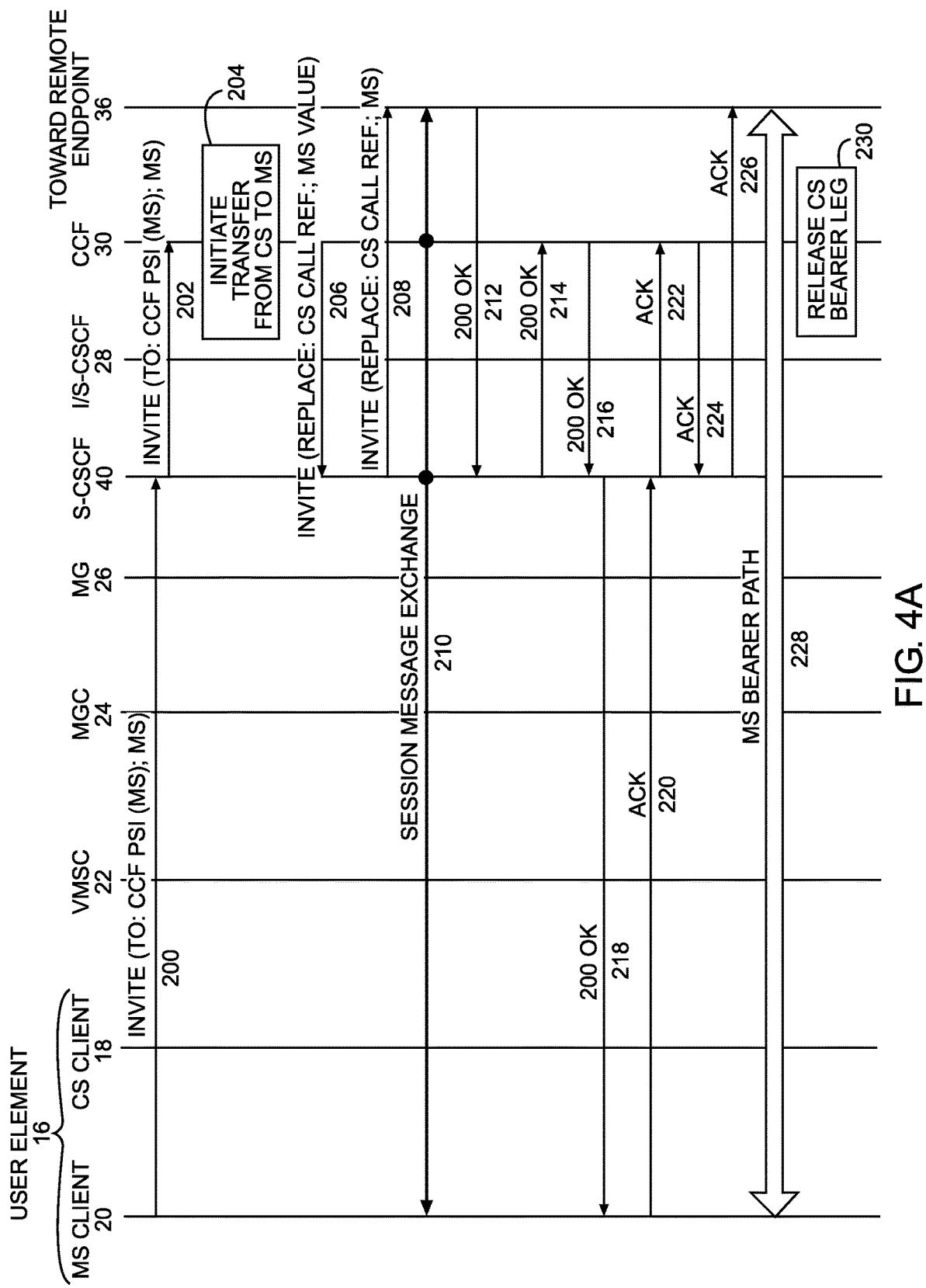
FIGS. 4A and 4B show a communication flow illustrating the transfer of the call established in FIGS. 3A and 3B to the multimedia subsystem according to one embodiment of the present invention.
Figure 4B:
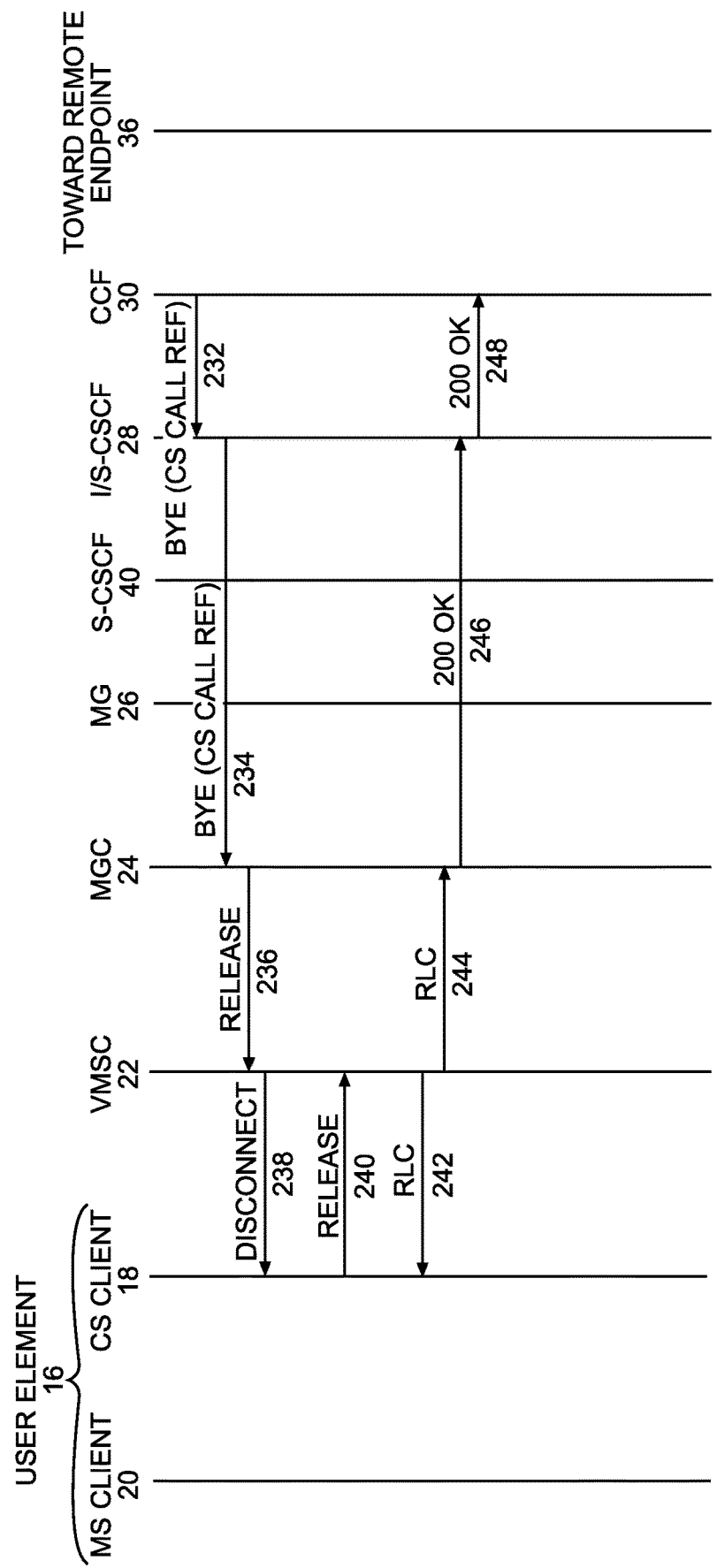

With reference to FIGS. 4A and 4B, a communication flow is illustrated wherein the call established in FIGS. 3A and 3B is transferred from the CS 14 to the MS 12. As such, the access signaling leg is established between the MS client 20 of the user element 16 and the CCF 30 through the S-CSCF 40, instead of being routed through the CS 14 via the media gateway controller 24 and the VMSC 22. Further, the bearer path will no longer be routed through the media gateway 26 to the CS client 18, but instead will be routed directly from the MS client 20 through the MS 12 toward the remote endpoint 36.

Initially, the user element 16 will recognize that there is a need for a transfer from the CS 14 to the MS 12, perhaps by sensing the availability of WLAN access and perhaps the waning of cellular access. The MS client 20 of the user element 16 may then register with the MS 12 if necessary (not shown), and send an Invite toward the CCF 30 using the MS PSI for the CCF 30 and a request to transfer to the MS 12 from the CS 14. The Invite will be received by the S-CSCF 40 (step 200), which will forward the Invite to the CCF 30 upon running the appropriate filter criteria (step 202). The CCF 30 will process the Invite and initiate a transfer from the CS 14 to the MS 12 (step 204). The CCF 30 will then send an Invite toward the remote endpoint 36. The Invite will be received by the S-CSCF 40 (step 206), which will then forward the Invite toward the remote endpoint 36 (step 208). The Invite will include a reference number for the existing call (CS CALL REF.) and provide instructions for the remote endpoint 36 to establish a new bearer path for the call directly with the MS client 20 instead of with the media gateway 26.

At this point, the MS client 20 of the user element 16 and the remote endpoint 36 will exchange the requisite session messages to enable an MS bearer path therebetween (step 210). These session messages will be sent through the S-CSCF 40 and the CCF 30. When the remote endpoint 36 is ready to make the transition, the S-CSCF 40 will receive a 200 OK message from the remote endpoint 36 (step 212). The S-CSCF 40 will send a 200 OK message to the CCF 30 (step 214), which will send a 200 OK message back through the S-CSCF 40 (step 216), which will forward the 200 OK message to the MS client 20 of the user element 16 (step 218). The MS client 20 will send an acknowledgement message back to the S-CSCF 40 (step 220), which will send the acknowledgement message to the CCF 30 (step 222). The CCF 30 will send the acknowledgement message back to the S-CSCF 40 (step 224), which will send the acknowledgement message toward the remote endpoint 36 (step 226).

At this point, the remote endpoint 36 and the MS client 20 of the user element 16 are ready to support communications over an MS bearer path established therebetween (step 228). The bearer and signaling paths through the CS 14 must then be torn down (step 230). Accordingly, the CCF 30 will send a Bye message identifying the reference number for the CS-based call to the I/S-CSCF 28 (step 232), which will send a Bye message to the media gateway controller 24 (step 234). The media gateway controller 24 will send a Release message to the VMSC 22 (step 236), which will send a Disconnect message to the CS client 18 of the user element 16 (step 238). The CS client 18 will respond by sending a Release message to the VMSC 22 to indicate that the Disconnect message was received (step 240). The VMSC 22 will then send a Release Complete message (RLC) back to the CS client 18 to end the circuit-switched connection (step 242). The VMSC 22 will also send a Release Complete message to the media gateway controller 24 (step 244). At this point, the circuit-switched connection between the user element 16 and the media gateway 26 no longer exists. The media gateway controller 24 will send a 200 OK message to the I/S-CSCF 28 to indicate that the circuit-switched portion of the call has ended (step 246). The I/S-CSCF 28 will then send the 200 OK message to the CCF 30 to indicate the status of the circuit-switched portion of the call (step 248).

At this point, the CS-based access signaling leg is released in favor of the MS-based access signaling leg. Notably, the remote signaling leg between the CCF 30 and the remote endpoint 36 remains intact. Notably, the information carried in the Invite may be provided in the Session Description Protocol (SDP) fields of the Invite. However, those skilled in the art will recognize that other messages, such as Refer and Update messages, may also be used to implement session transfer.

Figure 5A:
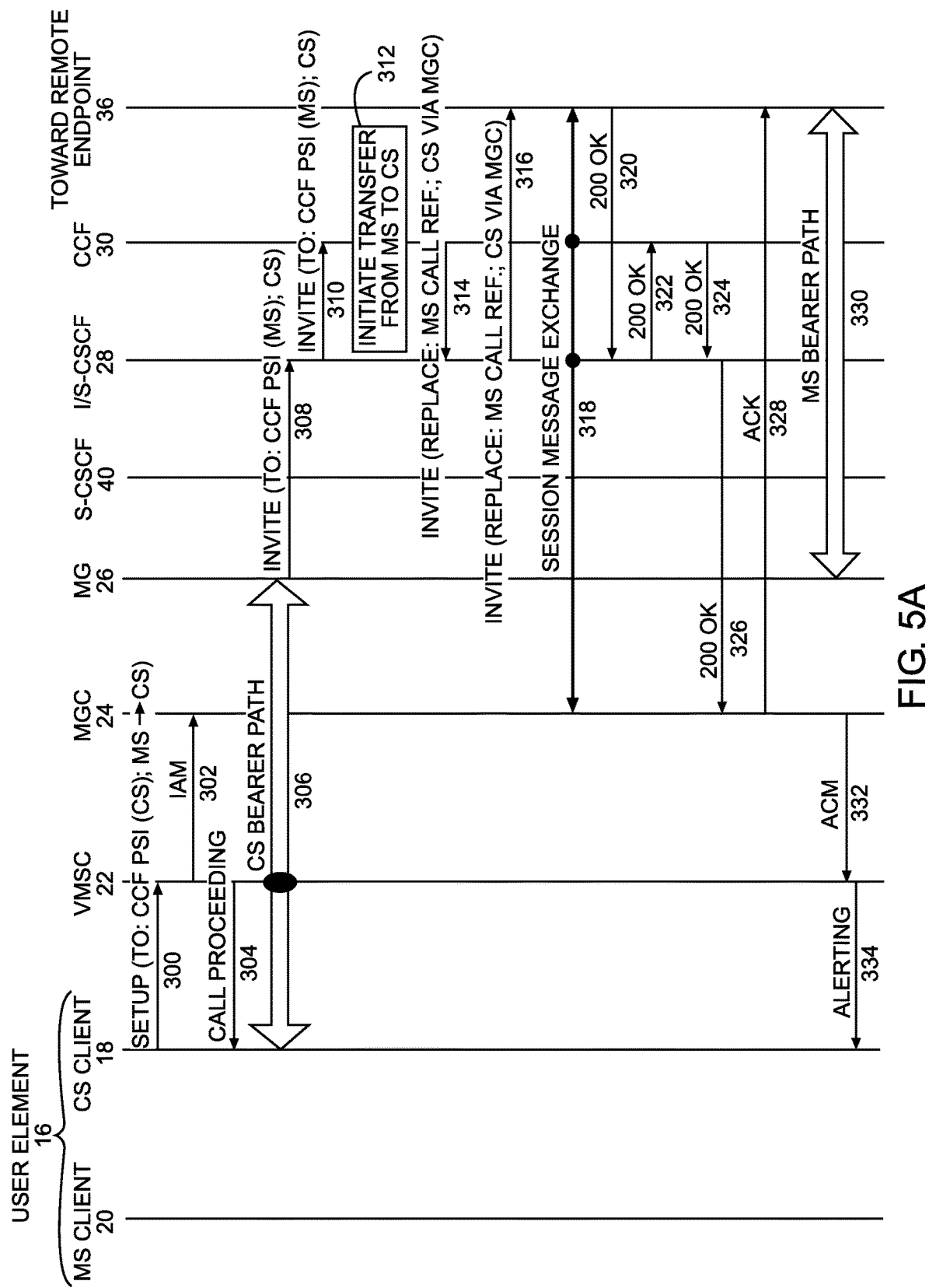
FIGS. 5A and 5B show a communication flow illustrating the transfer of the call of FIGS. 4A and 4B back to the circuit-switched subsystem according to one embodiment of the present invention.
Figure 5B:
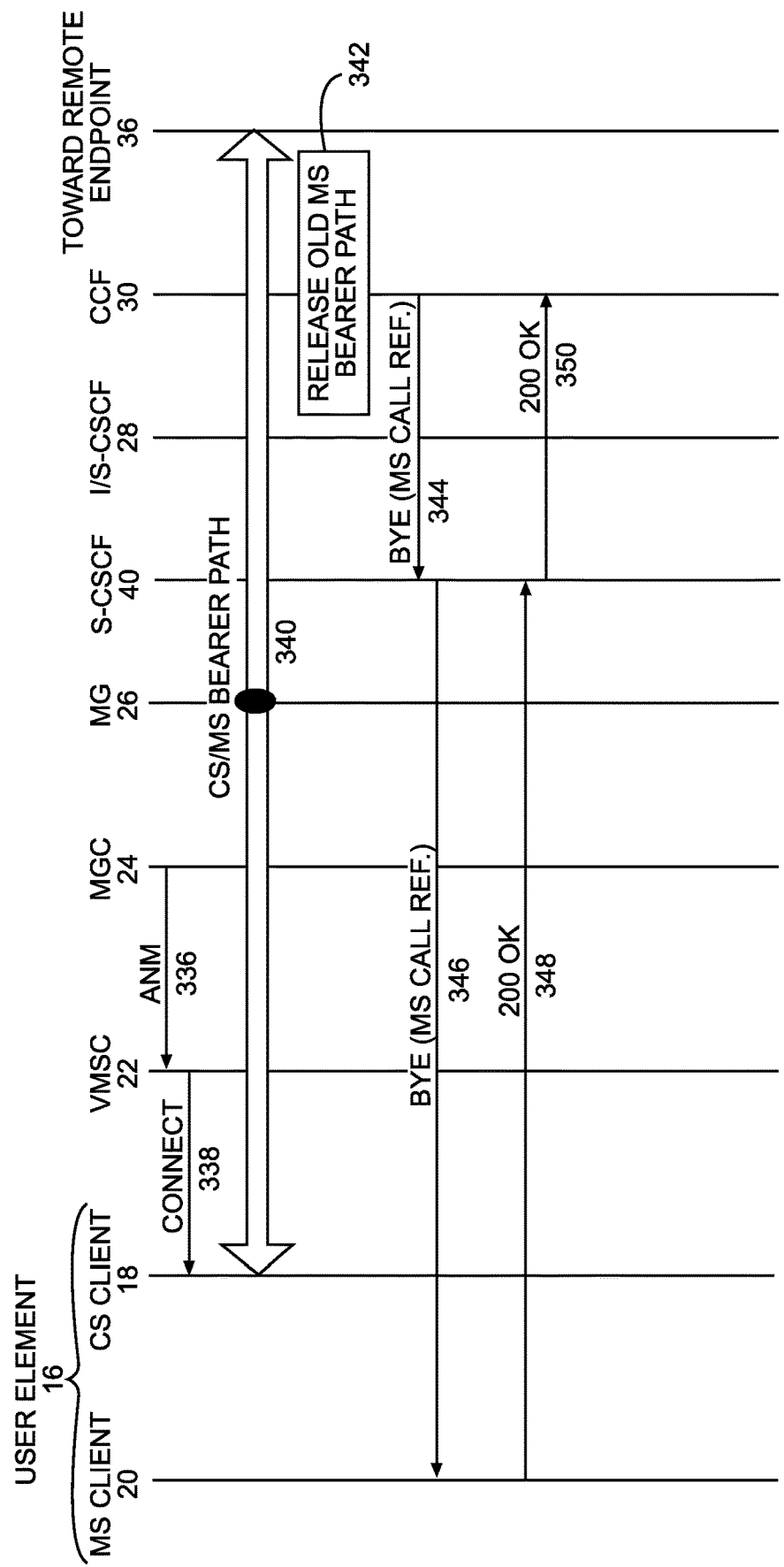

With reference to FIGS. 5A and 5B, a communication flow is provided wherein the MS-based call provided in FIGS. 4A and 4B is transferred back to the CS 14. When the user element 16 determines that there is a need for a transfer from the MS 12 to the CS 14, the user element 16 will register with the VMSC 22 if necessary (not shown). The user element 16 will subsequently initiate a call to the CCF 30 through the CS 14 using the CS PSI associated with the CCF 30 to request a transfer from the MS 12 to the CS 14. Accordingly, a Setup message may be sent from the CS client 18 of the user element 16 to the VMSC 22 (step 300). The VMSC 22 will route the call to the CCF 30 via the media gateway controller 24, and as such will send an IAM to the media gateway controller 24 (step 302). The VMSC 22 will send a Call Proceeding message back to the CS client 18 to indicate that the call is proceeding (step 304). At this time, the media gateway controller 24 will cooperate with the media gateway 26 to establish a CS bearer path with the CS client 18 of the user element 16 via the VMSC 22 (step 306). The media gateway controller 24 will create an Invite message intended for the CCF 30 that indicates that the call should be transferred from the MS 12 to the CS 14. The destination of the Invite will use the MS PSI associated with the CCF 30. The Invite will be sent to the I/S-CSCF 28 (step 308), which will send the Invite to the CCF 30 upon running the appropriate filter criteria (step 310).

The CCF 30 will then initiate the transfer from the MS 12 to the CS 14 (step 312) and send an Invite back to the I/S-CSCF 28 (step 314). The Invite will include a reference for the MS call (MS CALL REF.) and an indication that a CS call is going to be established via the media gateway controller 24. The Invite is then sent by the I/S-CSCF 28 toward the remote endpoint 36 (step 316). The requisite session message exchange is then provided between the media gateway controller 24 and the remote endpoint 36 via the I/S-CSCF 28 and the CCF 30 (step 318). After the session message exchange, the I/S-CSCF 28 will receive a 200 OK message from the remote endpoint 36 to indicate that the transfer is ready to take place (step 320). The I/S-CSCF 28 will route the 200 OK message to the CCF 30 (step 322), which will send the 200 OK message back to the I/S-CSCF 28 (step 324). The I/S-CSCF 28 will then send a 200 OK message to the media gateway controller 24 (step 326). The media gateway controller 24 will acknowledge receipt of the 200 OK message by forwarding an acknowledgement message toward the remote endpoint 36 via the I/S-CSCF 28 and the CCF 30 (step 328). At this point, an MS bearer path is established between the media gateway 26 and the remote endpoint 36 (step 330).

The media gateway controller 24 will then send an ACM to the VMSC 22 to indicate that the MS bearer path for the transfer is in place (step 322). The VMSC 22 will provide an Alerting message to the CS client 18 indicating the same (step 334). When the media gateway controller 24 is ready for the transfer, an Answer message is sent to the VMSC 22 (step 336), which will send a Connect message to the CS client 18 of the user element 16 (step 338). At this point, a CS/MS bearer path is established between the CS client 18 of the user element 16 and the remote endpoint 36 via the media gateway 26 (step 340). The call is then transferred back into the CS 14 and supported entirely over the CS/MS bearer path. Again, call control remains anchored at the CCF 30, wherein all signaling messages are passed through the CCF 30.

To release the old MS bearer path (step 342), the CCF 30 will send a Bye message to the S-CSCF 40 (step 344). The Bye message will include a reference for the old MS call (MS CALL REF.). The S-CSCF 40 will send the Bye message to the MS client 20 of the user element 16 (step 346), which will reply with a 200 OK message (step 348). The S-CSCF 40 will forward the 200 OK message to the CCF 30 (step 350). At this point, the old MS bearer path no longer exists. For transfers between the CS 14 and the MS 12, the CCF 30 remains the anchor point for the call, and for any signaling legs necessary for supporting the call with the remote endpoint 36 or with either the MS client 20 or CS client 18 of the user element 16. After the transfer, the CCF 30 will release any unnecessary signaling legs and bearer paths or legs.

Figure 6A:
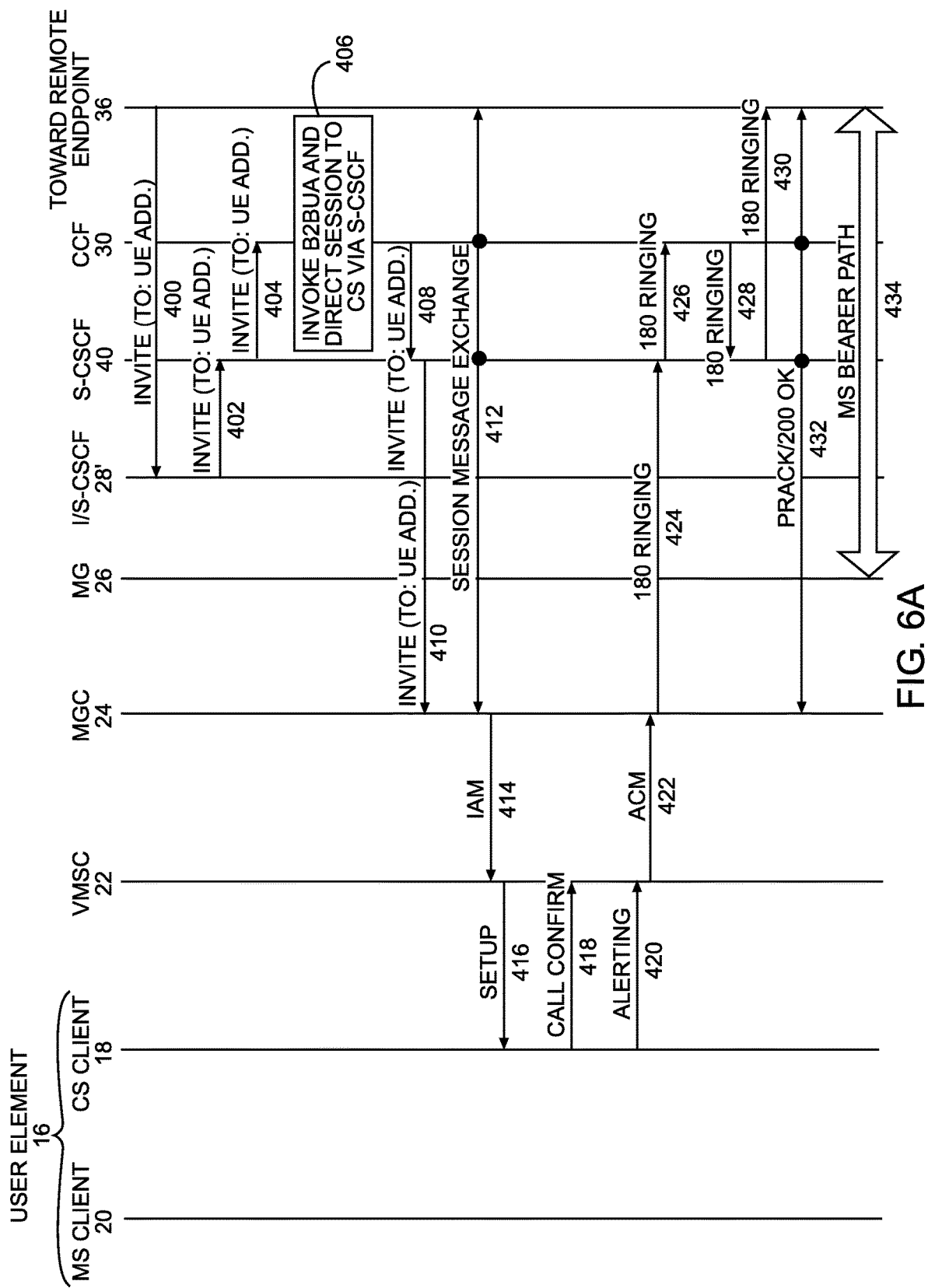
FIGS. 6A and 6B show a communication flow illustrating terminating an incoming call via the circuit-switched subsystem according to one embodiment of the present invention.
Figure 6B:
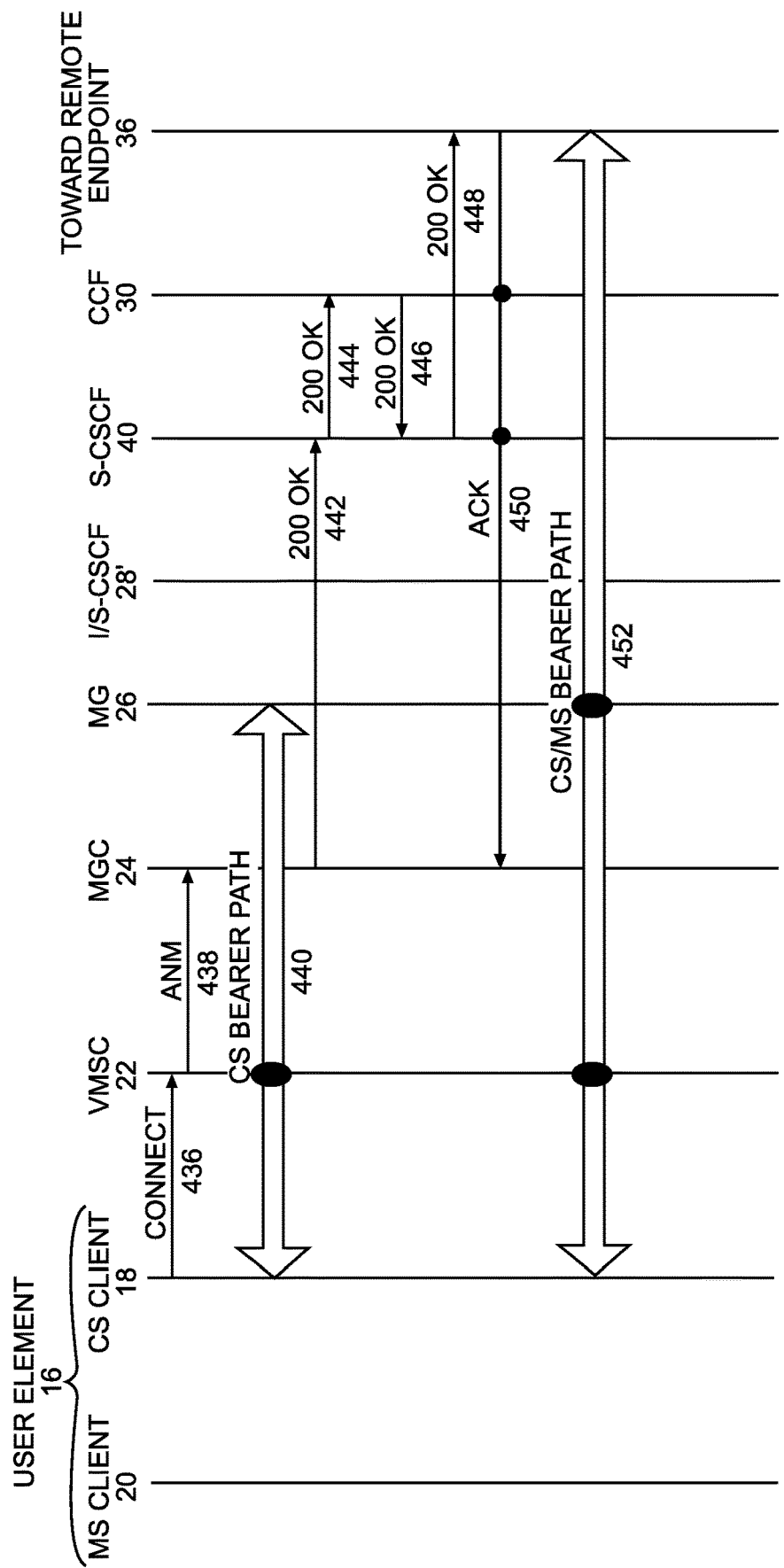

With reference to FIGS. 6A and 6B, a communication flow for terminating a call to the user element 16 via the CS 14 is provided. In this example, assume the call is initiated from a remote endpoint 36 within the MS 12. As such, an Invite from the remote endpoint 36 is delivered to an VS-CSCF 28' in the MS 12 (step 400). The Invite will identify the address of the user element (UE) 16. The I/S-CSCF 28' will send the Invite to the S-CSCF 40, which is serving the user element 16 (step 402). Applying the appropriate filter criteria to the Invite will result in the S-CSCF 40 forwarding the Invite to the CCF 30 (step 404). Again, the filter criteria may be obtained from the HSS 34, and will direct the S-CSCF 40 to invoke the CCF 30 as a service required for call signaling. The CCF 30 may also access information from the HSS 34. The information in the HSS 34 may indicate that the user element 16 is being served by the CS 14, and that calls should be routed to the CS client 18 of the user element 16.

As such, the CCF 30 will invoke a back-to-back user agent and direct the session to the CS 14 via the S-CSCF 40 (step 406). Accordingly, an Invite is sent to the S-CSCF 40 (step 408), which will forward the Invite to the media gateway controller 24 (step 410). The requisite session message exchange will then take place between the media gateway controller 24 and the remote endpoint 36 via the S-CSCF 40 and the CCF 30 (step 412). The media gateway controller 24 will then send an IAM to the VMSC 22 via an appropriate gateway mobile switching center (not shown) (step 414). The VMSC 22 will send a Setup message to the CS client 18 (step 416) to indicate that an incoming call is being routed to the user element 16. The CS client 18 of the user element 16 will respond by sending a Call Confirmation message to the VMSC 22 (step 418). When the CS client 18 provides an alert to the user of the user element 16, an Alerting message will also be sent back to the VMSC 22 to indicate that the call is being presented to the user (step 420). The VMSC 22 will send an ACM to the media gateway controller 24 (step 422). In response, the media gateway controller 24 will send a 180 Ringing message to the S-CSCF 40 (step 424), which will send the 180 Ringing message to the CCF 30 (step 426). The CCF 30 will send the 180 Ringing message back to the S-CSCF 40 (step 428), which will send the 180 Ringing message toward the remote endpoint 36 (step 430).

In this fashion, the signaling is always routed through the CCF 30 by the S-CSCF 40. The remote endpoint 36 and the media gateway controller 24 will exchange the PRACK and 200 OK messages via the S-CSCF 40 and the CCF 30 (step 432), wherein the MS bearer path is established between the media gateway 26 and the remote endpoint 36 (step 434). When the user of user element 16 answers the incoming call, the CS client 18 will send a Connect message to the VMSC 22 (step 436), which will send an ANM to the media gateway controller 24 via the gateway MSC (step 438). At this point, the CS bearer path is established between the CS client 18 of the user element 16 and the media gateway 26 via the VMSC 22 (step 440). In response, the media gateway controller 24 will send a 200 OK message to the S-CSCF 40 (step 442), which will send the 200 OK message to the CCF 30 (step 444). The CCF 30 will send the 200 OK message to the S-CSCF 40 (step 446), which will send the 200 OK message toward the remote endpoint 36 (step 448). Upon receiving an Acknowledgement originated at the remote endpoint 36 (step 450), the media gateway controller 24 will allow the media gateway 26 to effectively connect the CS bearer path and the MS bearer path to form the CS/MS bearer path, which extends between the remote endpoint 36 and the CS client 18 through the media gateway 26 and the VMSC 22 (step 452).

Figure 7A:
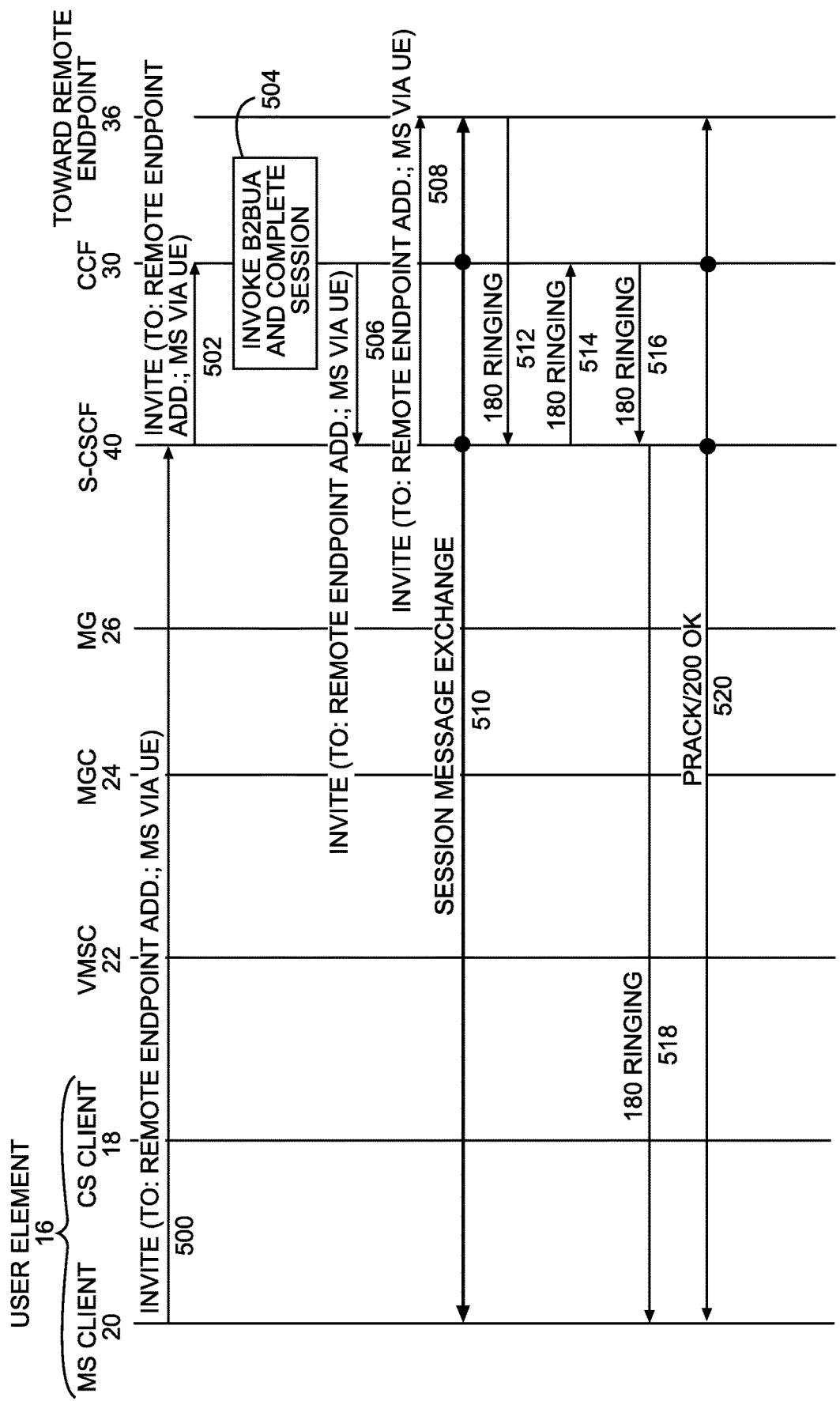
FIGS. 7A and 7B show a communication flow illustrating originating a call via the multimedia subsystem according to one embodiment of the present invention.
Figure 7B:
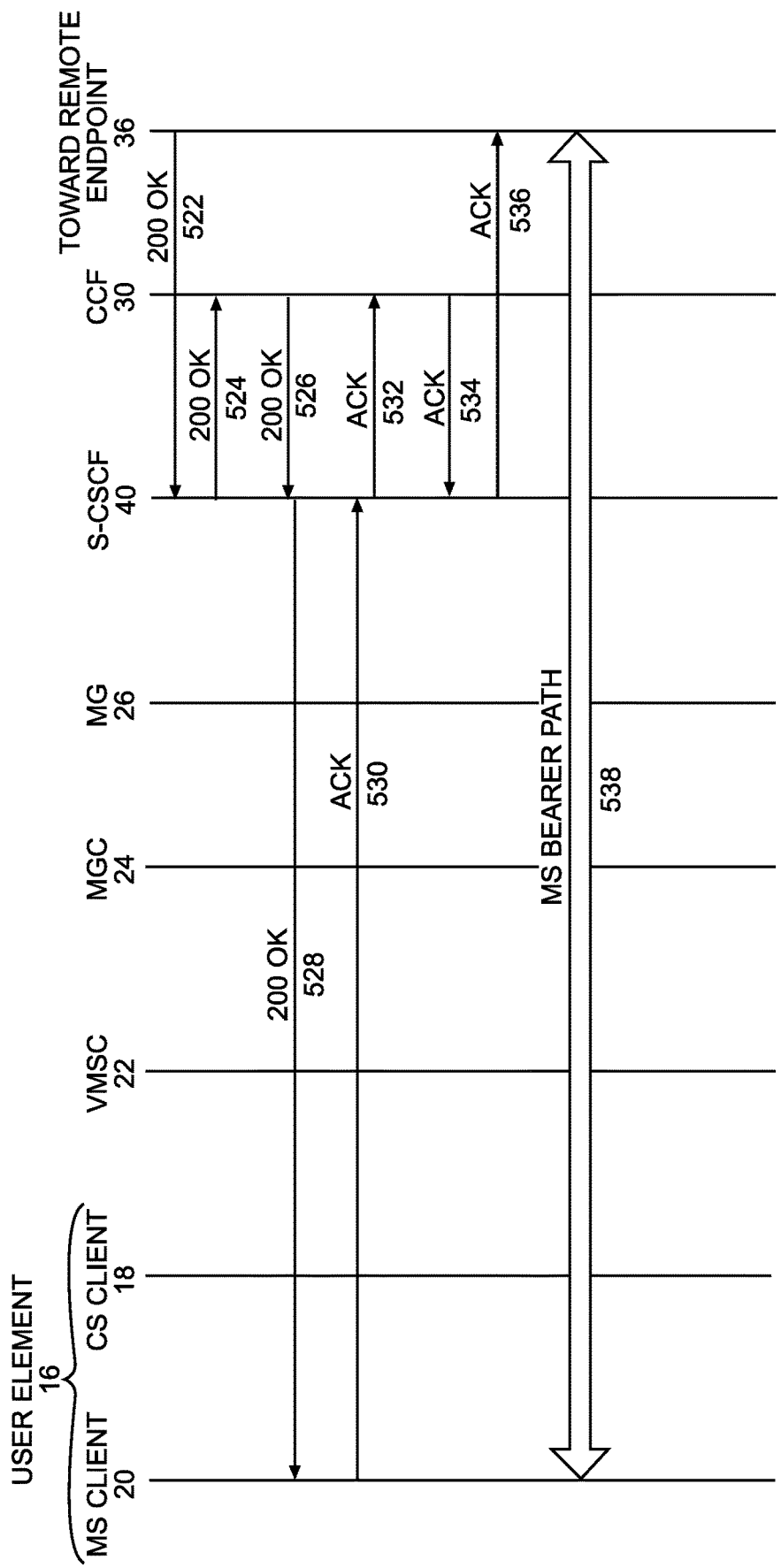

With reference to FIGS. 7A and 7B, a communication flow is provided for originating a call from the MS client 20 of the user element 16. Initially, the MS client 20 of the user element 16 will register with the MS 12, which will result in the user element 16 being assigned to the S-CSCF 40 (not shown). To initiate a call, the MS client 20 of the user element 16 will send an Invite, which will be directed to the S-CSCF 40 (step 500). The Invite will identify the remote endpoint address to which the call is intended, and will include an indication that the call will be supported by the MS client 20 through the MS 12 (without involving the CS 14). The S-CSCF 40 will use the filter criteria associated with the user element 16 to determine that call routing should be sent to the CCF 30, and as such, will send the Invite to the CCF 30 (step 502). The CCF 30 will invoke the back-to-back user agent and take the necessary steps to complete the session (step 504). As such, the CCF 30 will send an Invite toward the remote endpoint 36 via the S-CSCF 40 (steps 506 and 508). The MS client 20 of the user element 16 and the remote endpoint 36 will provide the requisite session message exchange to support an MS bearer path via the S-CSCF 40 and CCF 30 (step 510).

Once the call is presented to the remote endpoint 36, the S-CSCF 40 will receive a 180 Ringing message (step 512). The 180 Ringing message is sent to the CCF 30 (step 514), which will send the 180 Ringing message back to the S-CSCF 40 (step 516). Again, the S-CSCF 40 will ensure that all call signaling is routed through the CCF 30. The S-CSCF 40 will send the 180 Ringing message to the MS client 20 of the user element 16 (step 518), wherein the user element 16 and the remote endpoint 36 will exchange the requisite PRACK and 200 OK messages via the S-CSCF 40 and the CCF 30 (step 520). When the call is answered at the remote endpoint 36, the S-CSCF 40 will receive a 200 OK message (step 522). The S-CSCF 40 will route the 200 OK message through the CCF 30 (steps 524 and 526) and then send the 200 OK message to the MS client 20 of the user element 16 (step 528). The MS client 20 of the user element 16 will respond with an Acknowledgement message, which is received at the S-CSCF 40 (step 530). The S-CSCF 40 will send the Acknowledgement message through the CCF 30 (steps 532 and 534) and then forward the Acknowledgement message toward the remote endpoint 36 (step 536). At this point, an MS bearer path is established between the MS client 20 of the user element 16 and the remote endpoint 36 through the MS 12, without engaging the CS 14 (step 538). However, all call signaling is routed through the CCF 30 by the S-CSCF 40, such that the CCF 30 may remain an anchor for the call in case additional services are required or a transfer of the bearer path through the CS 14 is necessary or desired.

Figure 8A:
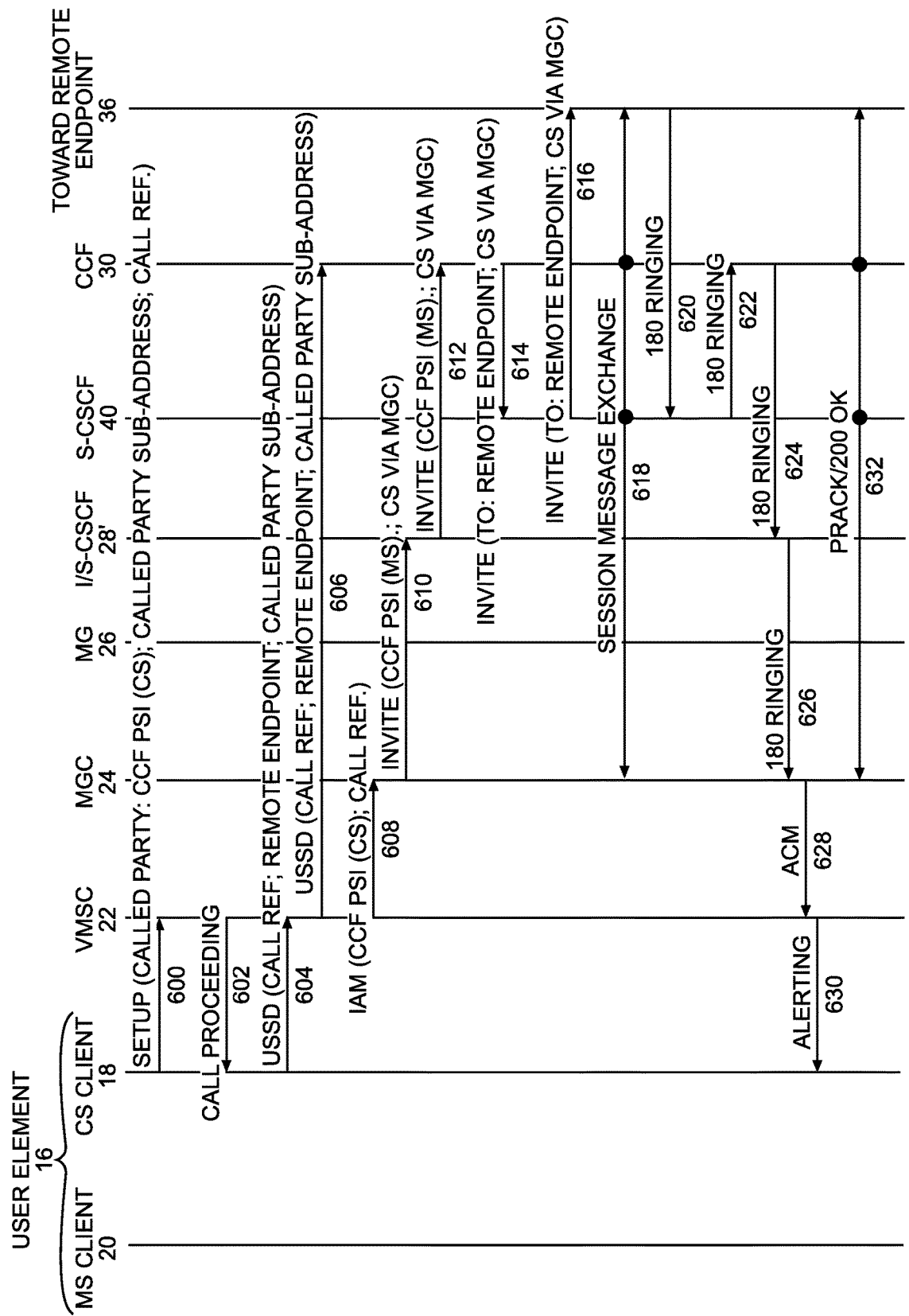
FIGS. 8A and 8B show a communication flow illustrating originating a call via the circuit-switched subsystem according to an alternative embodiment of the present invention.
Figure 8B:
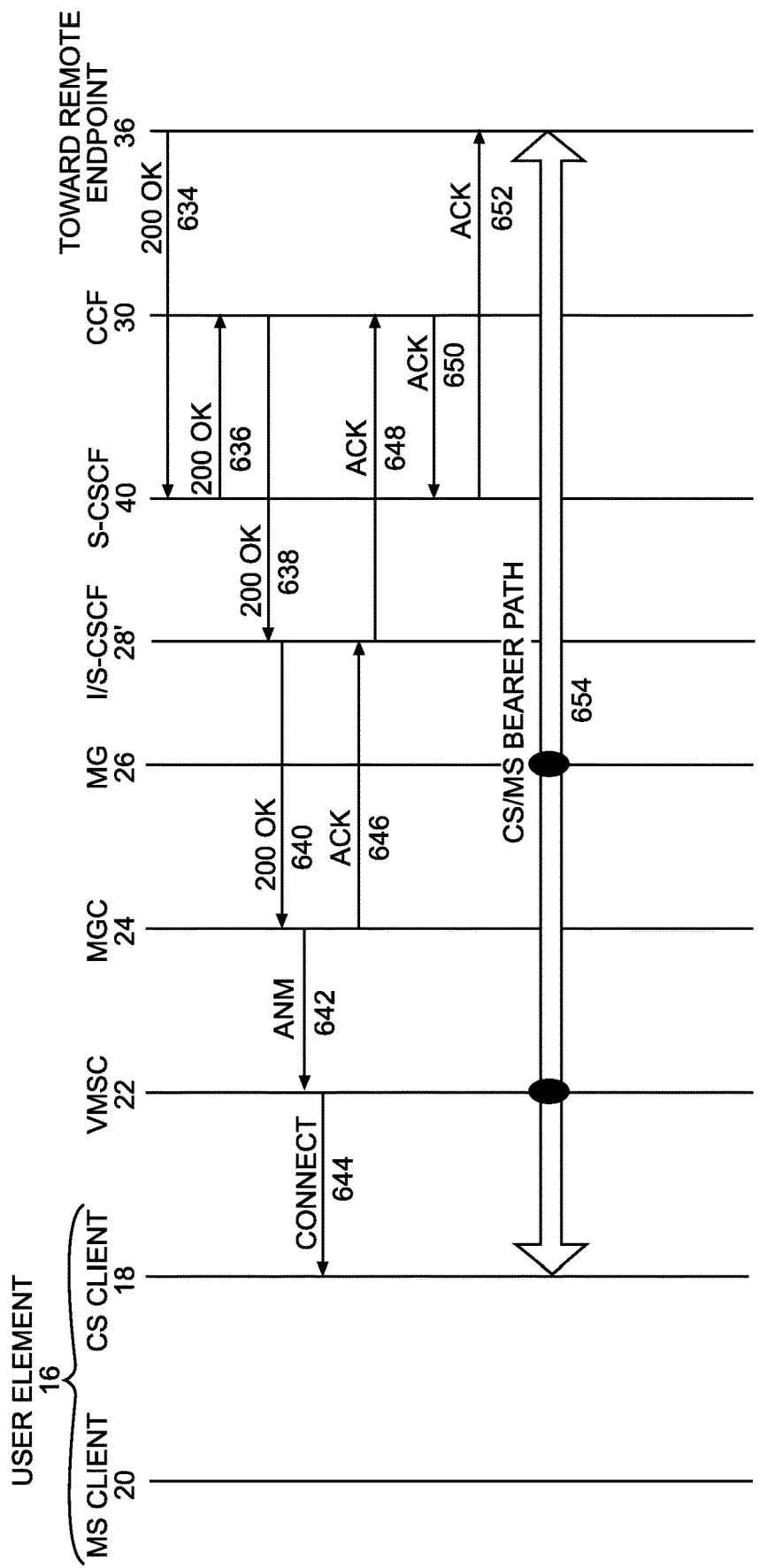

With reference to FIGS. 8A and 8B, an alternative technique is illustrated where the user element 16 will initiate outgoing calls to the remote endpoint 36 by initiating a call to the CCF 30 and using an alternate signaling channel, such as a Unstructured Supplementary Service Data (USSD) channel, to provide information identifying the remote endpoint 36 to the CCF 30. In this embodiment, the user element 16 includes decision logic to determine if and when to invoke the CCF 30 as an anchoring point for call signaling. Accordingly, the CS client 18 of the user element 16 originates a call to a directory number associated with the CCF 30. This directory number is essentially the CS PSI for the CCF 30. A called party sub-address may be set to a combination of a CCF sub-function, which indicates that the call is being originated from the CS 14 and requires anchoring at the CCF 30, and a call reference for the call being established. The call reference uniquely identifies the call at the user element 16 and at the CCF 30, once the CCF 30 receives the information. Alternatively, the user's identity sent in the calling party number or embedded in the CS PSI may be used to identify the call being established at the CCF 30.

As such, the CS client 18 of the user element 16 will send a Setup message to the VMSC 22 (step 600). The Setup message will indicate that a call is being originated to the CCF 30 using the CS-PSI of the CCF 30; a optionally a called party sub-address as described above including the call reference (CALL REF.). The VMSC 22 will respond with a Call Proceeding message, which is received by the CS client 18 of the user element 16 (step 602). Upon receipt of the Call Proceeding message from the VMSC 22, the user element 16 will initiate a USSD operation to request the CS origination anchoring service at the CCF 30. The user's identity, called party number, and optionally call reference, and any other information required to complete the call to the remote endpoint 36 is sent in a USSD message to the VMSC 22 (step 604). The VMSC 22 will forward the USSD message to the user's home location resource (HLR) (not shown), which will forward the message to the CCF 30 (step 606).

Upon establishing resources for the originating leg, the VMSC 22 will attempt to complete the call to the CCF 30 via the media gateway controller 24. As such, the VMSC 22 will send an IAM to the media gateway controller 24 (step 608). The IAM will provide the call reference and identify the CS PSI for the CCF 30. In response, the media gateway controller 24 will send an Invite intended for the CCF 30 using the MS PSI for the CCF 30 and indicate that a call is being initiated from the CS 14 via the media gateway controller 24. The Invite will be received by the I/S-CSCF 28' (step 610), which will send the Invite to the CCF 30 (step 612).

The CCF 30 will use the call reference or other means such as calling party number as available to associate the information in the Invite with that provided by the USSD information. The CCF 30 will terminate the incoming call leg that was originated to the CS PSI of the CCF 30, and will invoke a back-to-back user agent to originate a session to the remote endpoint 36, which was the originally called party. The CCF 30 may access the HSS 34 to obtain the address for the S-CSCF 40 and then route the call toward the remote endpoint 36 via the S-CSCF 40 or the CCF 30 may route the call to the S-CSCF via an I-CSCF. Notably, a conversion may be necessary from the directory number associated with the remote endpoint 36 and the address necessary for routing the Invite. The CCF 30 will provide this functionality. Once the Invite is received by the S-CSCF 40 (step 614), the Invite is sent toward the remote endpoint 36 (step 616). The media gateway controller 24 and the remote endpoint 36 will then provide the requisite session message exchange, such that an MS bearer path can be established between the media gateway 26 and the remote endpoint 36 (step 618). The messages exchanged during the session message exchange will be routed through the CCF 30 and the S-CSCF 40.

When the call is presented to the remote endpoint 36, the S-CSCF 40 will receive a 180 Ringing message (step 620), and will forward the 180 Ringing message to the CCF 30 (step 622). The CCF 30 will send the 180 Ringing message to the I/S-CSCF 28' (step 624), which will send a 180 Ringing message to the media gateway controller 24 (step 626). The media gateway controller 24 will send an ACM to the VMSC 22 to indicate that the call is being presented to the remote endpoint 36 (step 628). The VMSC 22 will then send an appropriate Alerting message to the CS client of the user element 16 (step 630). Meanwhile, the PRACK and 200 OK message exchange will take place between the media gateway controller 24 and the remote endpoint 36 via the S-CSCF 40 and the CCF 30 (step 632).

When the remote endpoint 36 is answered, the S-CSCF 40 will receive a 200 OK message (step 634), and send a 200 OK message to the CCF 30 (step 636). The CCF 30 will send a 200 OK message to the I/S-CSCF 28' (step 638), which will send the 200 OK message to the media gateway controller 24 (step 640). In response, the media gateway controller 24 will send an ANM to the VMSC 22 (step 642), which will send a Connect message to the CS client 18 of the user element 16 (step 644). The media gateway controller 24 will also send an Acknowledgement in response to the 200 OK message to the I/S-CSCF 28' (step 646). The I/S-CSCF 28' will forward the Acknowledgement to the CCF 30 (step 648), which will send the Acknowledgement message to the S-CSCF 40 (step 650). The S-CSCF 40 will then send the Acknowledgement message toward the remote endpoint 36 (step 652). Again, all messaging is routed through the CCF 30 by the S-CSCF 40. With the above, a CS/MS bearer path is established between the CS client 18 of the user element 16 and the remote endpoint 36 via the media gateway 26 and the VMSC 22 (step 654).

Figure 9:
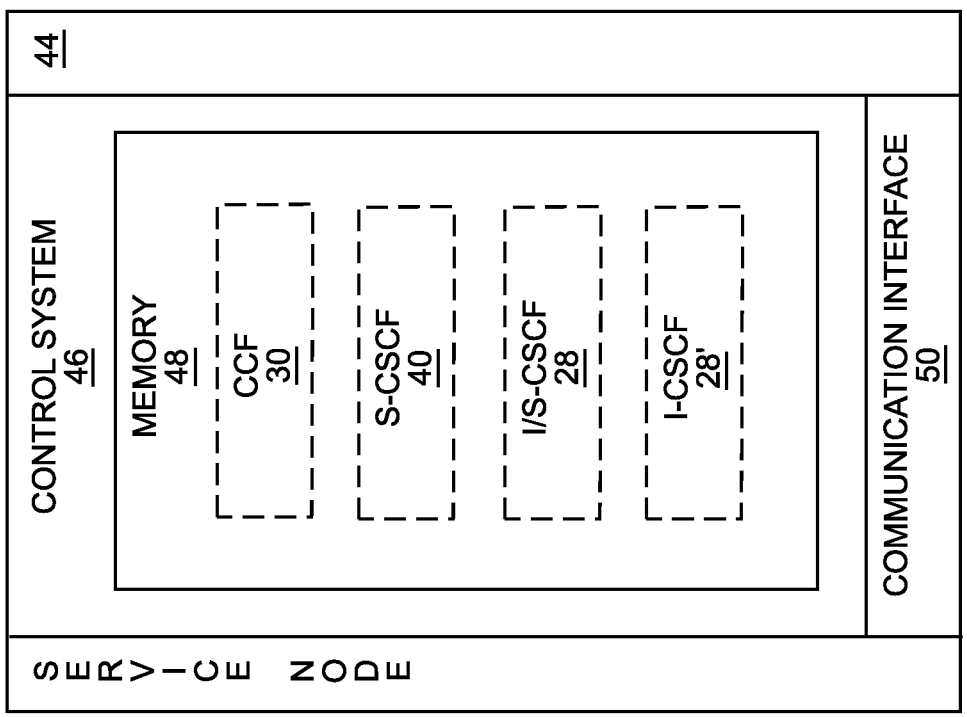
FIG. 9 is a block representation of a service node according to one embodiment of the present invention.

With reference to FIG. 9, a service node 44 is provided according to one embodiment of the present invention. The service node 44 may reside in the MS 12 and include a control system 46 and associated memory 48 to provide the functionality for any one or a combination of the following: the CCF 30, the S-CSCF 40, the I/S-CSCF 28, and the I/S-CSCF 28'. The control system 46 will also be associated with a communication interface 50 to facilitate communications with any entity affiliated with the MS 12 or appropriately associated networks.

Figure 10:
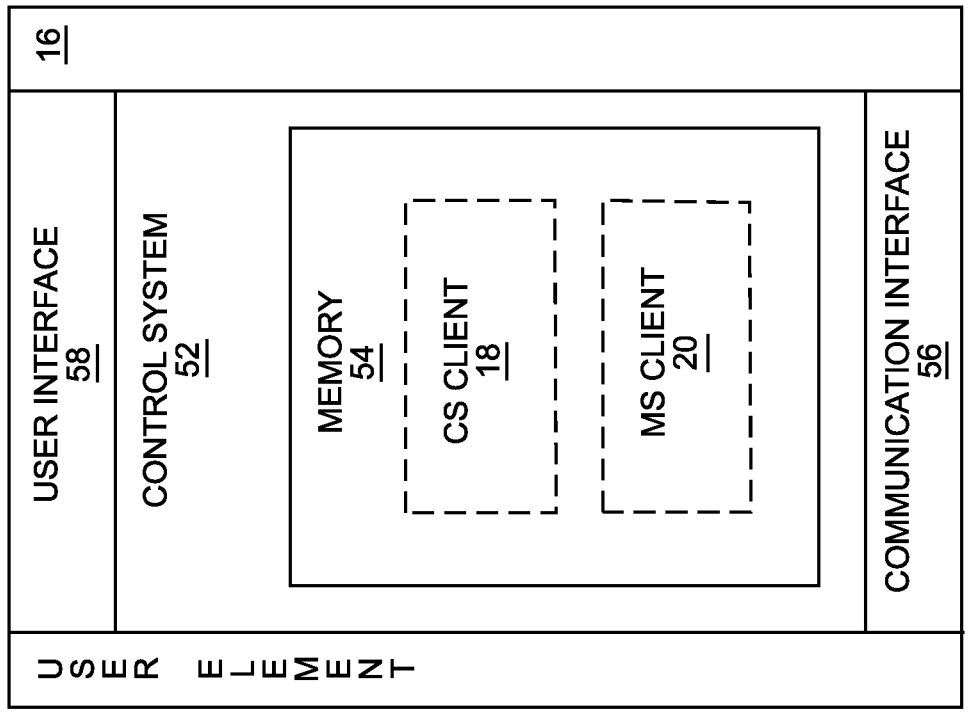
FIG. 10 is a block representation of a user element according to one embodiment of the present invention.

With reference to FIG. 10, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the MS 12 as described above. The control system 52 may also be associated with a user interface 58, which will facilitate interaction with the user. The user interface 58 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method of operation of a continuity control function, comprising:
   providing a signaling anchor point in a multimedia subsystem for a first access signaling leg and a remote signaling leg for a call between a user element and a remote endpoint, the first access signaling leg established between the signaling anchor point and the user element for the call via a transferring-out subsystem, and the remote signaling leg established between the signaling anchor point and the remote endpoint;
   establishing a second access signaling leg towards the user element via a transferring-in subsystem;
   replacing the first access signaling leg with the second access signaling leg, such that the second access signaling leg is anchored at the signaling anchor point; and
   providing call signaling via the second access signaling leg and the remote signaling leg to transfer at least a portion of a bearer path connected to the user element from a first network to a second network;
   wherein, when the call is originated from the user element, the continuity control function appears as a service provided by an application server and is invoked as a first service of a chain of services associated with the call, such that all of the services associated with the call other than the continuity control function are anchored by the continuity control function as part of the remote signaling leg of the call; and
   wherein when the call is terminated at the user element, the continuity control function is invoked as a last service of a plurality of services to be provided in a call signaling path formed by the first access signaling leg and the remote signaling leg, such that all of the plurality of services other than the continuity control function are provided in the remote signaling leg, and the remote signaling leg is anchored at the continuity control function.

2. The method of claim 1 further comprising receiving from the user element a request to establish the second access signaling leg and to transfer the call via the transferring-in subsystem.

3. The method of claim 2 wherein the request is generated from the user element when the user element determines a need to transfer the call.

4. The method of claim 2 wherein the request is originated from the user element using at least one of a multimedia subsystem address for the continuity control function, which provides the signaling anchor point, and a directory number within a circuit-switched subsystem, which is associated with the multimedia subsystem address.

5. The method of claim 1 further comprising releasing the first access signaling leg via the transferring-out subsystem.

6. The method of claim 1 further comprising coordinating call signaling exchanges for the call via the second access signaling leg and the remote signaling leg.

7. The method of claim 1 wherein access to one of the transferring-in subsystem and the transferring-out subsystem is provided via local wireless access outside of a circuit-switched subsystem.

8. The method of claim 7 wherein the local wireless access supports packet-based communications and the circuit-switched subsystem supports circuit-switched communications.

9. The method of claim 1 wherein a circuit-switched subsystem is provided by a cellular network.

10. The method of claim 1 wherein the continuity control function resides in a home multimedia subsystem and is invoked as a service by a serving call/session control function for calls from or intended for the user element.

11. The method of claim 1 further comprising:
    receiving a request intended for the continuity control function to originate the call from the user element to the remote endpoint;
    terminating the first access signaling leg;
    identifying an address or number associated with the remote endpoint; and
    establishing the remote signaling leg between the common signaling anchor point and the remote endpoint using the address or number; wherein the user element will initiate a call to the continuity control function.

12. The method of claim 11 wherein the address or number for the remote endpoint is obtained from the request.

13. The method of claim 11 wherein the address or number for the remote endpoint is identified from a message separate from the request.

14. The method of claim 13 wherein the message is sent via a Unstructured Supplementary Service Data (USSD) channel.

15. The method of claim 1 further comprising effecting subsequent transfers between the transferring-in and the transferring-out subsystems.

16. The method of claim 1 wherein the transferring-in subsystem is one of a circuit-switched subsystem and the multimedia subsystem and the transferring-out subsystem is the other of the circuit-switched subsystem and the multimedia subsystem.

17. The method of claim 16 further comprising:
    receiving an invite from the user element to initiate establishment of the second access signaling leg, the invite being received via a session control function resident in the multimedia subsystem;
    wherein establishing the second access signaling leg comprises establishing the second access signaling leg in response to receiving the invite.

18. The method of claim 17 further comprising releasing the first access signaling leg.

19. The method of claim 1 wherein the continuity control function anchors one or more supplementary services associated with the call such that they are not impacted by transfers affecting the access signaling leg.

20. A node operative to provide a continuity control function, comprising:
- a communication interface; and
- a control system associated with the communication interface and operative to:
- provide a signaling anchor point in a multimedia subsystem for a first access signaling leg and a remote signaling leg for a call between a user element and a remote endpoint, the first access signaling leg established between the signaling anchor point and the user element for the call via a transferring-out subsystem, and the remote signaling leg established between the signaling anchor point and the remote endpoint;
- establish a second access signaling leg towards the user element via a transferring-in subsystem;
- replace the first access signaling leg with the second access signaling leg, such that the second access signaling leg is anchored at the signaling anchor point; and
- provide call signaling via the second access signaling leg and the remote signaling leg to transfer at least a portion of a bearer path connected to the user element from a first network to a second network,
- wherein, when the call is originated from the user element, the continuity control appears as a service provided by an application server and function is invoked as a first service of a chain of services associated with the call, such that all of the services associated with the call other than the continuity control function are anchored by the continuity control function as part of the remote signaling leg of the call; and
- wherein when the call is terminated at the user element, the continuity control function is invoked as a last service of a plurality of services to be provided in a call signaling path formed by the first access signaling leg and the remote signaling leg, such that all of the plurality of services other than the continuity control function are provided in the remote signaling leg, and the remote signaling leg is anchored at the continuity control function.

21. The node of claim 20 wherein the control system is further operative to receive from the user element a request to establish the second access signaling leg and to transfer the call via the transferring-in subsystem.

22. The node of claim 20 wherein the control system is further operative to effect subsequent transfers between the transferring-in and the transferring-out subsystems.

23. The node of claim 20 wherein the transferring-in subsystem is one of the multimedia subsystem and a circuit-switched subsystem and the transferring-out subsystem is the other of the multimedia subsystem and the circuit-switched subsystem.

24. The node of claim 20 wherein the request is originated from the user element using at least one of a multimedia subsystem address for the continuity control function, which provides the signaling anchor point, and a directory number within a circuit-switched subsystem, which is associated with the multimedia subsystem address.

25. The node of claim 20 wherein the control system is further operative to:
- receive a request intended for the continuity control function to originate a call from the user element to the remote endpoint;
- terminate the first access signaling leg;
- identify an address or number associated with the remote endpoint; and
- establish the remote signaling leg for the call toward the remote endpoint using the address or number, wherein the user element will initiate a call to the continuity control function.

26. The node of claim 25 wherein the address or number for the remote endpoint is obtained from the request or from a message separate from the request.

27. The node of claim 20 wherein the continuity control function anchors one or more supplementary services associated with the call such that they are not impacted by transfers affecting the access signaling leg.

* * * * *

UNITED STATES PATENT AND TRADEMARK OFFICE
CERTIFICATE OF CORRECTION

PATENT NO. : 10,708,311 B2
APPLICATION NO. : 14/300470
DATED : July 7, 2020
INVENTOR(S) : Mahdi et al.

Page 1 of 1

It is certified that error appears in the above-identified patent and that said Letters Patent is hereby corrected as shown below:

In the Specification

In Column 8, Line 20, delete "I/S0-CSCF 28" and insert -- IS-CSCF 28 --, therefor.

In Column 11, Line 38, delete "VS-CSCF 28'" and insert -- IS-CSCF 28' --, therefor.

In Column 13, Line 23, delete "a Unstructured" and insert -- an Unstructured --, therefor.

In Column 13, Line 44, delete "a optionally" and insert -- and optionally --, therefor.

In the Claims

In Column 16, Line 44, in Claim 14, delete "a Unstructured" and insert -- an Unstructured --, therefor.

Signed and Sealed this
Fifth Day of January, 2021

Andrei Iancu
*Director of the United States Patent and Trademark Office*